(12) United States Patent
Tanaka

(10) Patent No.: US 8,456,653 B2
(45) Date of Patent: Jun. 4, 2013

(54) DATA PROCESSING APPARATUS FOR PRODUCING PRINT JOB DATA WHOSE AUTHORITY IS MANAGED BY EXTERNAL SERVER, AND IMAGE PROCESSING APPARATUS FOR PRINTING A PRINT JOB WHOSE AUTHORITY IS MANAGED BY EXTERNAL SERVER

(75) Inventor: Hirotomo Tanaka, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 978 days.

(21) Appl. No.: 11/564,216

(22) Filed: Nov. 28, 2006

(65) Prior Publication Data

US 2007/0133044 A1 Jun. 14, 2007

(30) Foreign Application Priority Data

Dec. 12, 2005 (JP) .................. 2005-357377

(51) Int. Cl.
*G06F 3/12* (2006.01)
*H04L 29/06* (2006.01)

(52) U.S. Cl.
USPC ........ 358/1.13; 358/1.14; 358/1.15; 713/153; 713/155; 713/161

(58) Field of Classification Search
USPC ............... 358/1.13, 1.14, 1.15; 713/155, 153, 713/161
See application file for complete search history.

(56) References Cited

U.S. PATENT DOCUMENTS

| | | | | |
|---|---|---|---|---|
| 5,869,824 A * | 2/1999 | Okada et al. | .................. | 235/380 |
| 5,933,498 A * | 8/1999 | Schneck et al. | .................. | 705/54 |
| 6,237,099 B1 * | 5/2001 | Kurokawa | .................. | 726/4 |
| 6,289,450 B1 * | 9/2001 | Pensak et al. | .................. | 713/167 |
| 6,339,825 B2 * | 1/2002 | Pensak et al. | .................. | 713/158 |
| 6,647,388 B2 * | 11/2003 | Numao et al. | .................. | 1/1 |
| 6,778,289 B1 * | 8/2004 | Iwata | .................. | 358/1.15 |
| 7,143,210 B2 * | 11/2006 | Ferlitsch | .................. | 710/38 |
| 7,367,060 B2 * | 4/2008 | Someshwar | .................. | 726/27 |
| 2003/0182475 A1 * | 9/2003 | Gimenez | .................. | 710/8 |
| 2004/0125402 A1 * | 7/2004 | Kanai et al. | .................. | 358/1.15 |
| 2005/0021980 A1 | 1/2005 | Kanai | | |
| 2007/0146768 A1 * | 6/2007 | Isoda | .................. | 358/1.14 |
| 2007/0279674 A1 * | 12/2007 | Oomura | .................. | 358/1.14 |
| 2008/0002226 A1 | 1/2008 | Shigeeda | | |
| 2009/0019526 A1 * | 1/2009 | Fukushima | .................. | 726/3 |
| 2009/0185223 A1 * | 7/2009 | Kanai et al. | .................. | 358/1.15 |

FOREIGN PATENT DOCUMENTS

| | | |
|---|---|---|
| JP | 2004-094920 A | 3/2004 |
| JP | 2004-152262 A | 5/2004 |
| JP | 2005-038371 A | 2/2005 |
| JP | 2005-259108 A | 9/2005 |

* cited by examiner

Primary Examiner — Dennis Dicker

(74) Attorney, Agent, or Firm — Canon USA Inc IP Division

(57) ABSTRACT

A data processing apparatus includes a storage unit configured to store electronic data including first data for identifying policy data that is information indicating an authority for handling the electronic data and is managed by a server apparatus. The data processing apparatus includes a print job data production unit configured to produce print job data based on electronic data to be printed, an acquisition unit configured to acquire the first data included in the electronic data, an adding unit configured to add the first data acquired by the acquisition unit to the print job data, and a sending unit configured to send the print job data having the first data added thereto to an image processing apparatus.

6 Claims, 21 Drawing Sheets

FIG.7C
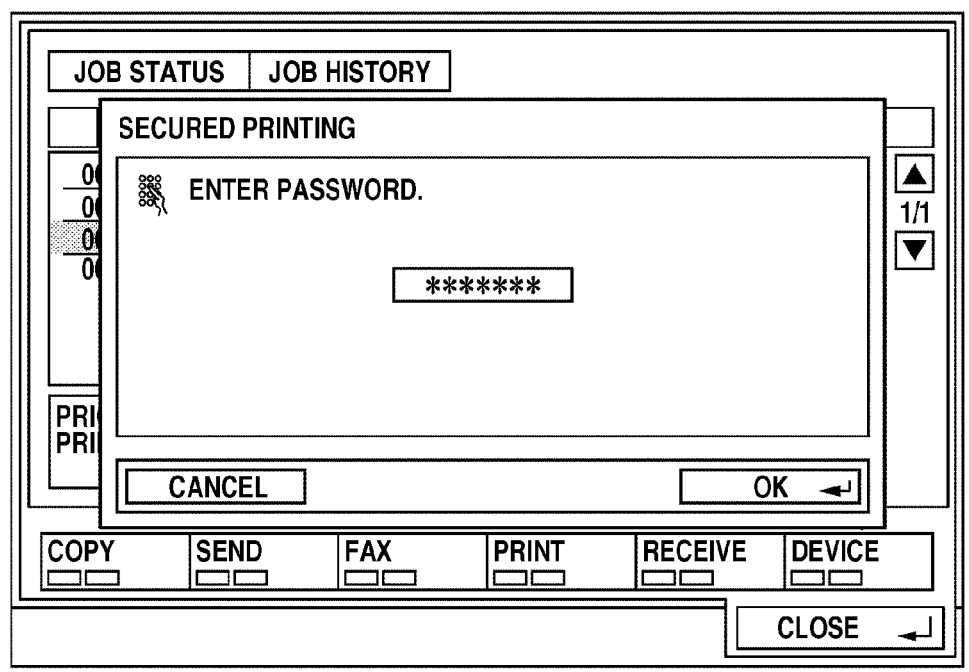
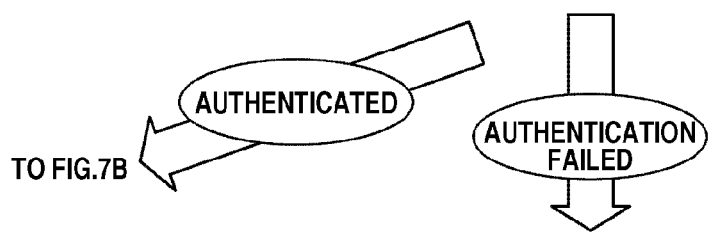
TO FIG.7B

FIG.8

LIST OF DISPLAY ICONS

8002 — SECURED PRINTING (POLICY USED)

8004 — SECURED PRINTING (POLICY NOT USED)

8006 — BOX PRINTING (POLICY USED)

8008 — BOX PRINTING (POLICY NOT USED)

MEMORY MAP OF STORAGE MEDIUM

DATA PROCESSING APPARATUS FOR PRODUCING PRINT JOB DATA WHOSE AUTHORITY IS MANAGED BY EXTERNAL SERVER, AND IMAGE PROCESSING APPARATUS FOR PRINTING A PRINT JOB WHOSE AUTHORITY IS MANAGED BY EXTERNAL SERVER

BACKGROUND OF THE INVENTION

1. Field of the Invention

The present invention relates to a data processing apparatus that produces print job data and to an image processing apparatus that outputs the print job data received from the data processing apparatus.

2. Description of the Related Art

Conventionally, a security policy (hereinafter simply referred to as a "policy") that indicates an authority for accessing and handling electronic data that is stored in a data processing apparatus such as a personal computer is applied to the electronic data. In such a method, an access authority is set so that a person other than a user who is registered as an authorized user to a server apparatus that manages a policy cannot either access the electronic data nor perform printing, (for example, Japanese Patent Application Laid-Open No. 2005-38371). Thus, a permission for accessing electronic data registered to an image processing apparatus can be limited to appropriate users.

In addition, in a technique related to printing of electronic data, a data processing apparatus sends print job data produced based on the electronic data to an image processing apparatus so as to store the print job data in a storage device in the image processing apparatus. A function that implements that operation is called "box printing". By using a box printing function, the print job data that is stored in a storage device of an image processing apparatus can be repeatedly printed.

In addition, there is a function called "secured printing". In the secured printing, the following operations are performed. First, print job data provided with a password that is produced by a printer driver of a data processing apparatus is received by an image processing apparatus, and the image processing apparatus temporarily stores the received print job data. Then, upon input of a correct password through an operation unit, the image processing apparatus prints out the print job data that is stored in a storage device thereof.

As described above, in the box printing and the secured printing, print job data produced based on electronic data is stored in a storage device of an image processing apparatus.

However, in the case of box printing or secured printing of electronic data to which a policy is applied, a policy similar to a policy that is applied to the electronic data cannot be applied to the print job data that is stored in a storage device of an image processing apparatus. This is because at the time the electronic data is converted into print job data by a printer driver in a data processing apparatus, data related to the policy is lost.

SUMMARY OF THE INVENTION

An embodiment of the present invention is directed to a data processing apparatus that applies a policy for electronic data that is an object of a print job to be produced by the data processing apparatus.

In addition, an embodiment of the present invention is directed to an image processing apparatus that selectively restricts an output of a print job data based on the print job data to which the policy is applied, which is produced by the data processing apparatus.

According to an aspect of the present invention, at least one embodiment is directed to a data processing apparatus that includes: a storage unit configured to store electronic data including first data for identifying policy data that is information indicating an authority for handling the electronic data and is managed by a server apparatus; a print job data production unit configured to produce print job data based on electronic data to be printed; an acquisition unit configured to acquire the first data included in the electronic data; an adding unit configured to add the first data acquired by the acquisition unit to the print job data; and a sending unit configured to send the print job data having the first data added thereto to an image processing apparatus.

According to another aspect of the present invention, at least one embodiment is directed to an image processing apparatus that includes: a storage unit configured to store print job data received from an external apparatus; a user identification unit configured to identify a user operating the image processing apparatus; a receiving unit configured to receive an instruction for outputting the print job data stored in the storage unit; and a control unit configured to selectively restrict outputting of the print job data based on user information for identifying the user identified by the user identification unit and first information for identifying an authority for handling a print job, the first information being added to the print job data that is an object of the outputting instruction received by the receiving unit and being managed by a server apparatus.

According to yet another aspect of the present invention, at least one embodiment is directed to a method in a data processing apparatus configured to store electronic data including first data for identifying policy data that is information indicating an authority for handling the electronic data and is managed by a server apparatus. The method includes: producing print job data based on electronic data to be printed; acquiring the first data included in the electronic data; adding the acquired first data to the print job data; and sending the print job data having the first data added thereto to an image processing apparatus.

According to yet another aspect of the present invention, at least one embodiment is directed to a method in an image processing apparatus including: storing print job data received from an external apparatus in a storage unit; identifying a user operating the image processing apparatus; receiving an instruction for outputting the print job data stored in the storage unit; and selectively restricting outputting of the print job data based on user information for identifying the identified user and first information for identifying an authority for handling a print job, the first information being added to the print job data that is an object of the received instruction and is managed by a server apparatus.

According to yet another aspect of the present invention, a storage medium stores a program for causing a data processing apparatus or an image processing apparatus to perform the print job production method or the print job output method.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 7C illustrates an example of a user interface screen that indicates a state of a job that is input to the document management unit of the MFP a shown in FIG. 1 and whose secured printing is requested.

FIG. 8 illustrates an example of an icon for discriminating an attribute of a job registered to the document management unit shown in FIG. 2.

DETAILED DESCRIPTION OF THE EMBODIMENTS

Various exemplary embodiments, features, and aspects of the invention will be described in detail below with reference to the drawings. It should be noted that the relative arrangement of the components, the numerical expressions and numerical values set forth in these embodiments do not limit the scope of the present invention unless it is specifically stated otherwise.

First Exemplary Embodiment

<System Configuration>

Figure 1:
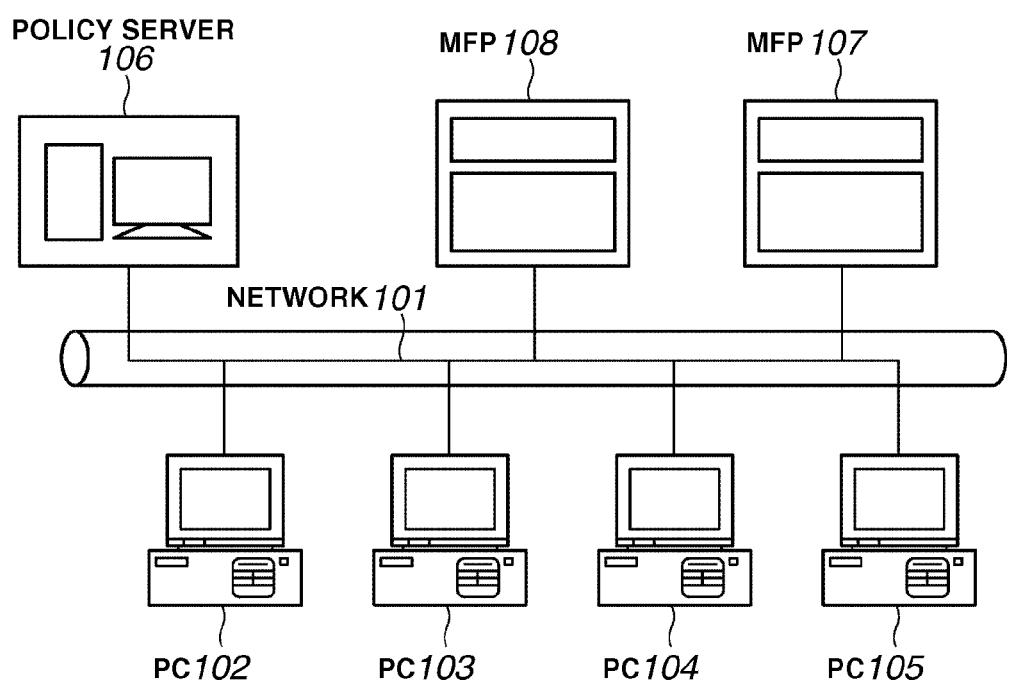
FIG. 1 illustrates an example of a system that includes a data processing apparatus and an image processing apparatus according to a first exemplary embodiment of the present invention.

FIG. 1 illustrates an example of a system that includes a data processing apparatus and an image processing apparatus according to a first exemplary embodiment of the present invention.

Referring to FIG. 1, personal computers (PCs) 102 through 105, each of which is a data processing apparatus, are connected to a network 101. In addition, a policy server 106 and multifunction peripherals (MFPs) 107 and 108, each of which is an image processing apparatus, are connected to the network 101. The personal computers 102 through 105, the policy server 106, and the MFPs 107 and 108 communicate with one another using a protocol such as TCP/IP via the network 101.

In this exemplary embodiment, although not shown in FIG. 1, a number of other apparatuses such as a computer, an MFP, and other terminal apparatuses can be connected via the network 101. Hereinbelow, a description is made using the PC 102 and the MFP 107 as a representative of the PCs and the MFPs, respectively.

<Hardware Configuration of PC and Policy Server>

Figure 12:
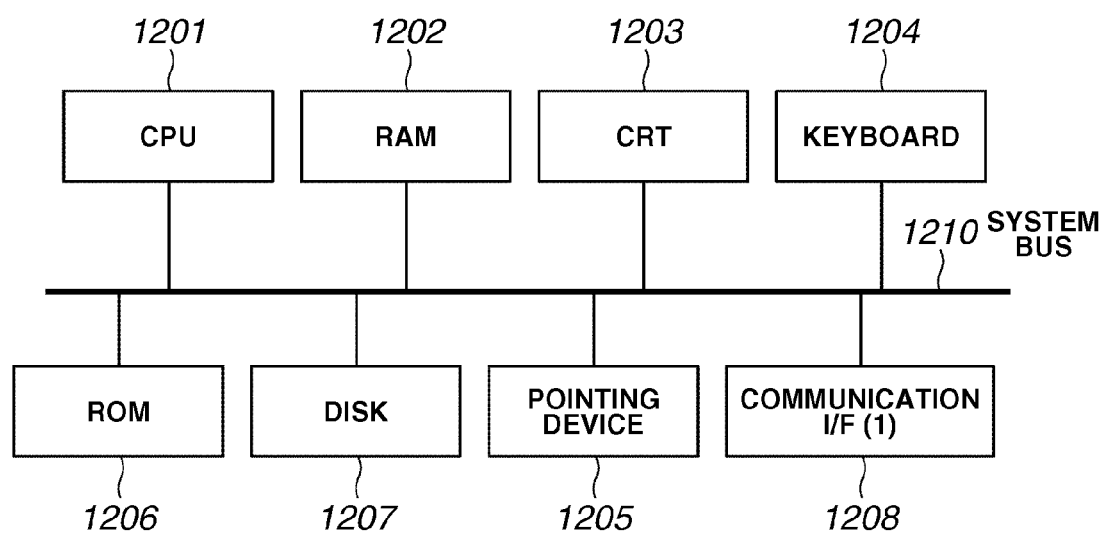
FIG. 12 illustrates a hardware configuration of each of PCs 102 through 105 and a policy server 106.

FIG. 12 illustrates a hardware configuration of each of the PCs 102 through 105 and the policy server 106. The PCs 102 through 105 and the policy server 106 have a common hardware configuration. Referring to FIG. 12, a CPU 1201, a RAM 1202, a cathode ray tube (CRT) 1203, and a keyboard 1204 are mutually connected via a system bus 1210. In addition, a ROM 1206, a disk 1207, a pointing device 1205, and a communication interface (I/F) 1208 are connected to the system bus 1210. The disk 1207 is a non-volatile storage device such as a hard disk. In this exemplary embodiment, the CRT 1203 is used as a display device. However, another display device such as a liquid crystal display device can be used.

A program that controls the PCs 102 through 105 and the policy server 106 is stored inn the ROM 1206 or the disk 1207. The control program is read to the RAM 1202 and executed by the CPU 1201.

The CPU 1201 displays an operation screen and data via the CRT 1203. In addition, the CPU 1201 receives an instruction from a user performing an operation of the keyboard 1204 and the pointing device 1205. In addition, the CPU 1201 communicates with other devices that are connected to the network 101 via the communication I/F 1208.

In this exemplary embodiment, unless especially noted otherwise, the CPU 1201 receives an input from a user performing an operation of the keyboard 1204 and the pointing device 1205 via the system bus 1210. In addition, the CPU 1201 controls the RAM 1202, the CRT 1203, the ROM 1206, the disk 1207, and the communication I/F 1208.

The PCs 102 through 105 store printer driver software, which is to be described later below, in the disk 1207. In addition, various kinds of electronic data are stored in the disk 1207. The policy server 106 stores policy data and software for operating a policy server in the disk 1207.

Figure 4A:
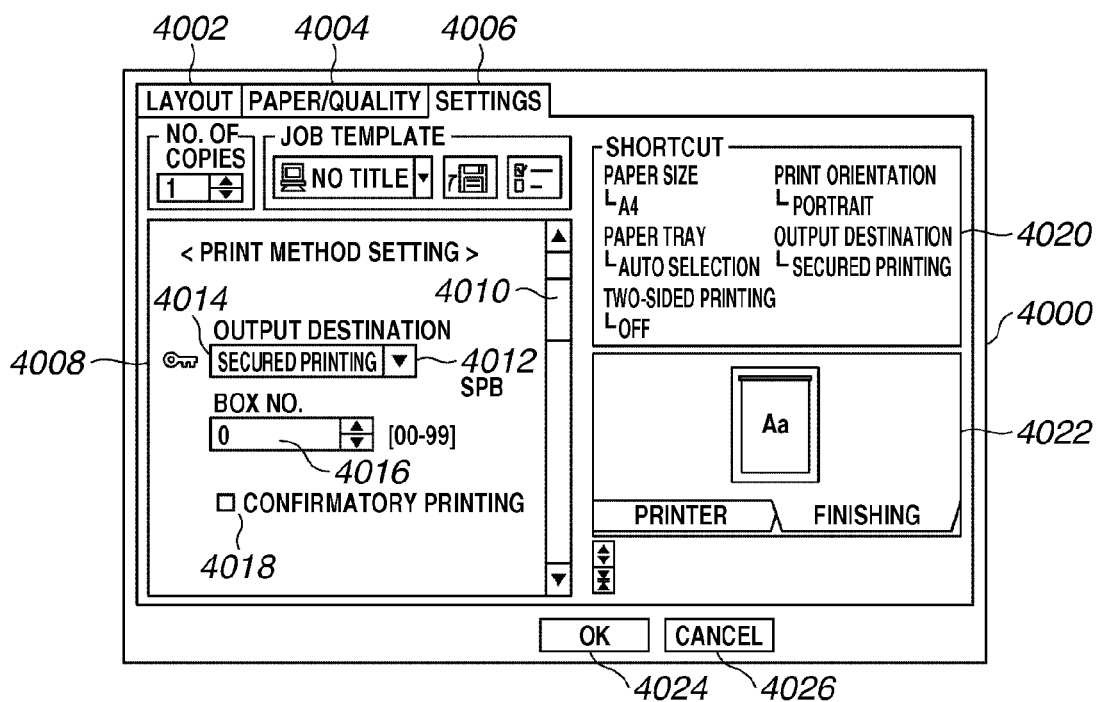
FIG. 4A illustrates a user interface screen of a printer driver for a personal computer (PC) shown in FIG. 1.
Figure 4B:
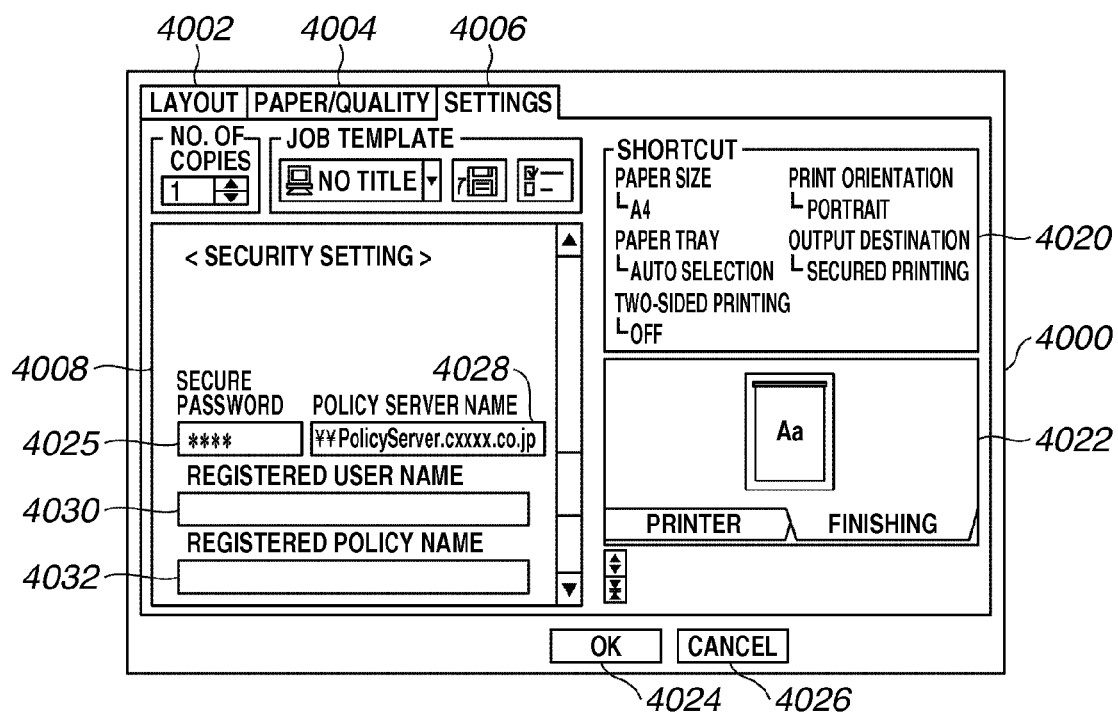
FIG. 4B illustrates a user interface screen of a printer driver for a PC shown in FIG. 1.

In addition, a printer driver, which is to be described later below, displays a driver setting screen as shown in FIG. 4A and FIG. 4B on the CRT 1203.

<Policy Server>

The policy server 106 is a server that manages an authority related to access to and handling of electronic data that is handled in the PCs 102 through 105 (hereinafter, the authority is referred to as a "policy"). The authority related to access to and handling of electronic data defines whether a user can access the electronic data and whether the user can perform handling of the electronic data, such as browsing and printing, per each user. The electronic data referred to here includes document data, image data, audio data, moving image data, and text data.

By registering a policy for electronic data to the policy server 106, the policy is applied to the electronic data. The policy server 106 can manage a plurality of policies for electronic data. Information related to a policy for electronic data that the policy server 106 manages is called "policy data".

<Policy Data>

Figure 13:
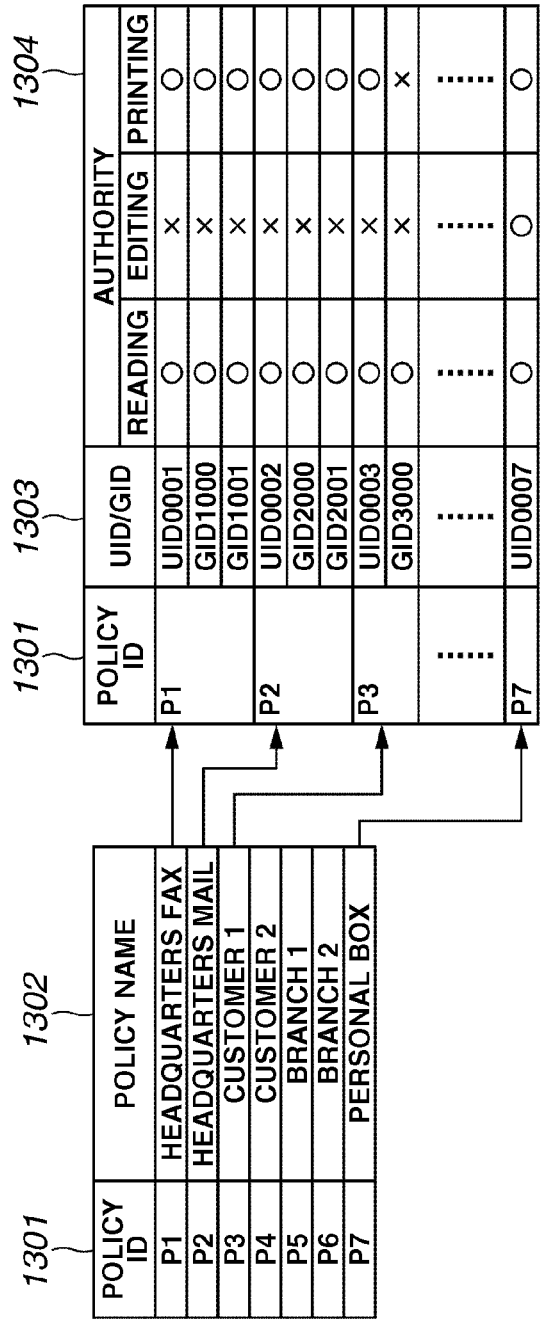
FIG. 13 illustrates an example of policy data that is managed by the policy server 106.

FIG. 13 illustrates an example of policy data managed by the policy server 106. The policy data is stored in the disk 1207 of the policy server 106.

Referring to FIG. 13, the policy data includes a policy ID 1301, a policy name 1302, a UID/GID 1303, and a field 1304. The policy ID 1301 is used for uniquely identifying the policy. The policy name 1302 is a character string used by a user to identify the policy and is linked with the policy ID. The UID/GID 1303 records a user ID or a group ID to which the policy is applied. The field 1304 indicates an authority that is permitted for each UID or GID.

In the authority field 1304, bits that indicate whether a user is permitted to perform handling of data, such as reading, editing, and printing of data, are included. In the case of the example shown in FIG. 13, "o" indicates that the user is permitted for the handling, and "x" indicates that the user is not permitted for the handling. By using the policy data, a setting as to which handling is permitted/inhibited for the user or the group identified by the UID or GID can be defined per each policy ID 1301.

<Electronic Document List>

Figure 14:
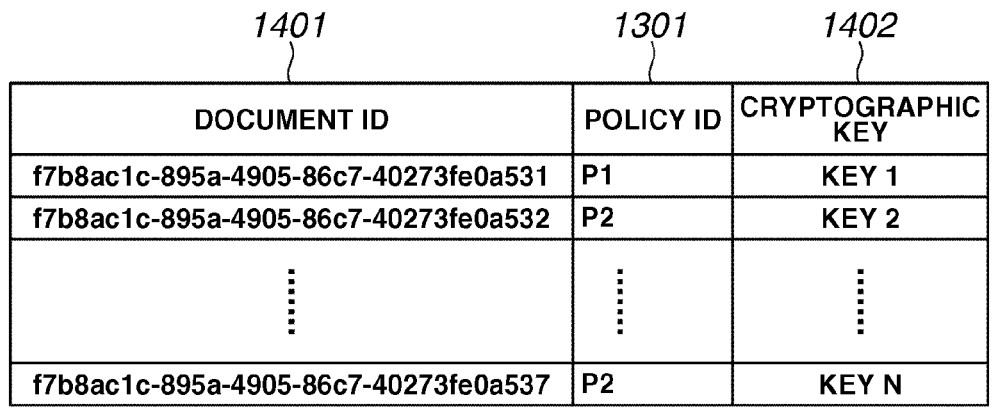
FIG. 14 illustrates an example of an electronic document list that is managed by the policy server 106.

FIG. 14 illustrates an example of an electronic document list that the policy server 106 manages. The electronic document list is stored in the disk 1207 of the policy server 106.

The electronic document list is a table that indicates a relationship of correspondence between a document ID and the policy ID 1301. By using the electronic document list, the user can refer to which policy is applied to which electronic data. In addition, the electronic data to which the policy is applied is encrypted. A key 1402, which is used for encryption/decryption is stored in the policy server 106, while being linked with a document ID 1401.

<Format of Electronic Data>

Figure 15:
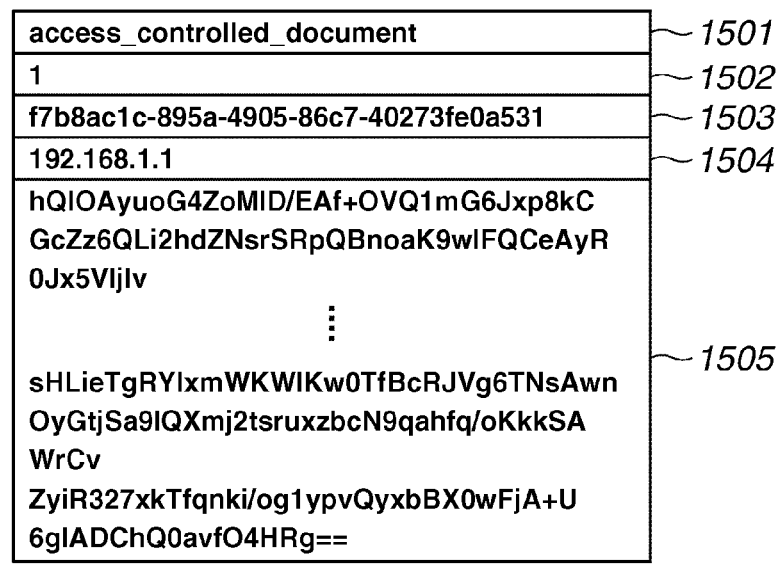
FIG. 15 illustrates an example of a format of electronic data to which a policy is applied.

FIG. 15 illustrates an example of a format of electronic data to which a policy is applied. A file header 1501 includes information (a specific character string) for identifying a type of the format of electronic data. In the case of the example shown in FIG. 15, the file header 1501 includes a character string "access_controlled_document", which indicates that the access authority for the document is managed. A version 1502 indicates a version of the electronic data.

A document ID 1503 is an ID for uniquely identifying the electronic data. The policy server 106 utilizes the document ID 1503 for determining the policy to be applied to the electronic data.

Policy server identification information 1504 indicates information for identifying the policy server 106. In the case of the example shown in FIG. 15, an IP address of the policy server 106 is stored as the policy server identification information 1504. However, the policy server identification information 1504 can be other information such as a host name.

A data portion 1505 includes a content of the electronic data. The data portion 1505 is encrypted by using a cryptographic key issued by the policy server 106.

In applying an access authority to the electronic data that is stored in the disk 1207 of the PC 102, that is, in applying the policy to the electronic data, the user performs the following operations.

The user produces electronic data with an operation of the PC 102, for example. Alternatively, the user can use existing electronic data, instead of newly producing electronic data. Then, the PC 102 acquires a document ID of the electronic data from the policy server 106 via the network 101. Then, the PC 102 specifies the policy that is previously registered to the policy server 106, together with the document ID. Then, the policy server 106 stores the document ID, the policy ID, and the cryptographic key in the electronic document list (FIG. 14) stored in the disk 1207. Then, the policy server 106 sends the cryptographic key to the PC 102 via the network 101. The PC 102 encrypts the electronic data by using the received cryptographic key (the data portion 1505 shown in FIG. 15). Then, the PC 102 adds the document ID 1503 acquired from the policy server 106 and information (such as a host name or an IP address) for identifying the policy server 106 (the policy server identification information 1504 shown in FIG. 15) to the encrypted data portion. The received cryptographic key can be deleted after the encryption is completed. As a result of the processing as described above performed by the PC 102 and the policy server 106, the electronic data becomes electronic data provided with the policy and having a format as shown in FIG. 15.

Next, a description is made as to a case where the PC 102 performs handling of the electronic data provided with the policy.

When the user who desires to handle the electronic data operates the PC 102, the PC 102 sends the document ID 1503 and various conditions (the user ID and a setting as to browsing, printing, copying, and distribution) related to reference to a document to the policy server 106 via the network 101. Then, the policy server 106 refers to the electronic document list shown in FIG. 14 so as to identify the policy ID that corresponds to the document ID 1503 received from the PC 102. Then, the policy server 106 determines an authority of the user that corresponds to the specified document ID with reference to the policy data shown in FIG. 13. When the handling that the user requests is a handling that is permitted by the authority of the user, the policy server 106 sends the cryptographic key that corresponds to the received document ID 1503 to the PC 102 via the network 101. Then, the PC 102 decrypts the encrypted data portion 1505 with the received cryptographic key so as to perform the handling of the decrypted data that the user desires.

The control of the access authority is not limited to handling of electronic data by the PCs 102 through 105. That is, the control of the access authority applies to the case where the MFPs 107 and 108 perform handling of electronic data.

<Configuration of MFP 107>

Figure 2:
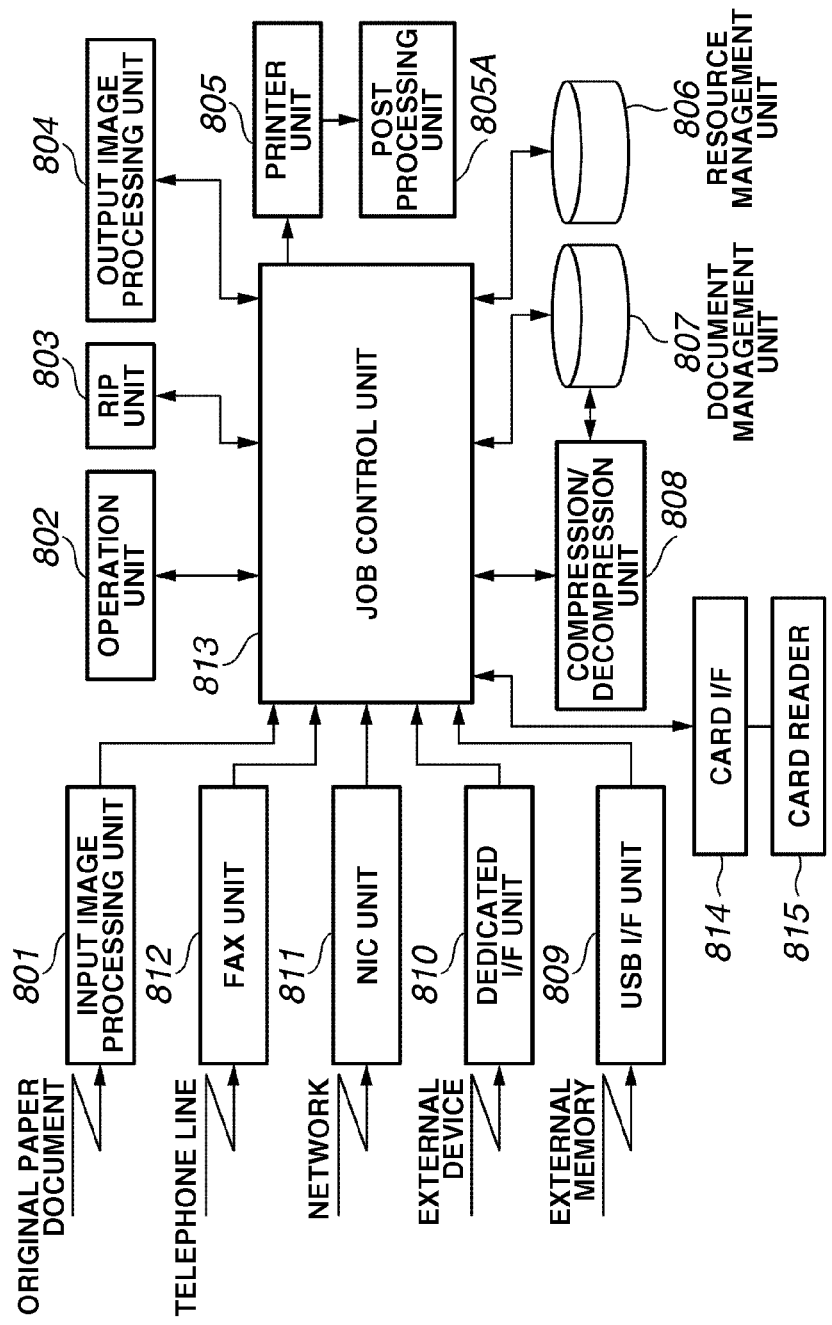
FIG. 2 illustrates a hardware configuration of a multifunction peripheral (MFP) shown in FIG. 1.

FIG. 2 illustrates an example of a hardware configuration of the MFP 107 shown in FIG. 1.

In this exemplary embodiment, the MFP 107 includes a memory such as a hard disk that is capable of storing data of a plurality of jobs. In addition, the MFP 107 is an image processing apparatus that includes a copying function by which job data output from a scanner can be printed by a printer unit via the memory. In addition, the MFP 107 includes a plurality of functions such as a printing function by which print job data output from an external apparatus such as the PC 102 can be printed by a printing unit via the memory.

In addition, the MFP 107 can be a single function image processing apparatus (single function peripheral: SFP) that includes a printing function only. In either case, the MFP 107 can have a configuration with which the control according to this exemplary embodiment can be implemented.

Referring to FIG. 2, the MFP 107 includes an input image processing unit 801, a FAX unit 812, and a network interface card (NIC) unit 811. The input image processing unit 801 reads an image of an original paper document and processes read image data. The FAX unit 812 sends and receives an image using a telephone line. The FAX unit 812 can be a facsimile machine. The NIC unit 811 sends and receives image data and device information using the network 101. In addition, the MFP 107 includes a dedicated interface (I/F) unit 810 or a universal serial bus (USB) interface (USB I/F) unit 809. The dedicated interface unit 810 sends and receives image data to and from an external apparatus. The USB I/F unit 809 sends and receives image data to and from a USB device. The USB device can be a USB memory (a type of removable medium).

In addition, the MFP 107 includes a job control unit 813. The job control unit 813 temporarily stores image data and serves as a traffic control unit that determines and arranges a path, according to the purpose of use of the MFP 107. The job control unit 813 includes a CPU, a RAM, and a ROM (each of which is not shown) so as to control the MFP 107.

In addition, the MFP 107 includes a document management unit 807. The document management unit 80 includes a memory such as a hard disk (HDD) that is capable of storing a plurality of image data.

The CPU included in the job control unit 813, for example, controls registration and reading of image data, while serving as a primary unit for the control. For example, the CPU performs control so that a plurality of image data sent from the input image processing unit 801 or image data of a facsimile job that is input through the FAX unit 812 can be stored in the hard disk.

In addition, the CPU performs control so that print job data sent from an apparatus external to the PC 102, which is input via the NIC unit 811, or image data that is produced based on the print job data can be stored in the document management unit 807. In addition, the CPU performs control so that a plurality of kinds of image data such as various image data input through the dedicated I/F unit 810 or the USB I/F unit 809 can be stored in the document management unit 807.

In addition, the CPU appropriately reads image data stored in the document management unit 807 and sends the read image data to an output unit such as the printer unit 805 so that output processing such as print processing by the printer unit 805 can be performed.

In addition, in response to an instruction from a user, the CPU performs control so that image data read from the document management unit 807 can be transferred to the PC 102 or an external apparatus such as another MFP.

A post processing unit 805A that performs post processing such as stapling can be connected to the printer unit 805.

In addition, the MFP 107 includes a compression/decompression unit 808. The compression/decompression unit 808 compresses image data, as necessary, in storing the image data in the document management unit 807. In addition, the compression/decompression unit 808 decompresses image data to original image data at the time of reading the image data that is compressed and stored.

The document management unit 807 is capable of storing print job data that is input via the NIC unit 811, intermediate language data that is produced by the job control unit 813, and bitmap data that is rasterized by an RIP unit 803.

In addition, a resource management unit 806 stores various kinds of parameter tables that are handled in common, such as a font, a color profile, and a gamma table. The parameter tables can be called as necessary. In addition, the resource management unit 806 is capable of storing a new parameter table and also correcting and updating a parameter table.

The job control unit 813, when PDL data is input as the print job data, performs raster image processing (RIP) on the input PDL data by the RIP unit 803 so as to produce rasterized bitmap data. In addition, the job control unit 813 performs image processing on an image to be printed by using an output image processing unit 804.

In addition, the document management unit 807 can store intermediate data and print-ready data (bitmap data for printing and compressed data of the bitmap data) of the image data produced in the above processing.

The job control unit 813 controls whether the data produced based on an output job is processed to be image data (bitmap data) or registered to the document management unit 807 as intermediate data or a display list.

The printer unit 805 forms an image on a sheet based on the data sent from the job control unit 813. The sheet that printed out by the printer unit 805 is conveyed to the post processing unit 805A so as to be subjected to sorting processing or finishing processing.

Here, the job control unit 813 performs control so that the jobs are smoothly input and performed. The paths of the jobs are switched as described below according to the purpose of use of the MFP. Note that in this exemplary embodiment, a case of access in which the document management unit 807 is an initial point or an endpoint of a flow is described only, and other cases of access are not described here, although it is commonly known that image data is stored as intermediate data. In addition, in this exemplary embodiment, the processing by the compression/decompression unit 808 and the post processing unit 805A that is performed as necessary and the processing by the job control unit 813, which is a core unit for the processing, are omitted here so that an outline of the flow can be easily understood.

A copying function is a function for processing performed via a data processing path from the input image processing unit 801, then to the output image processing unit 804, and then to the printer unit 805.

A FAX sending function is a function for processing performed via a data processing path from the input image processing unit 801 to the FAX unit 812.

A FAX receiving function is a function for processing performed via a data processing path from the FAX unit 812, then to the output image processing unit 804, and then to the printer unit 805.

A network scanning is a function for processing performed via a data processing path from the input image processing unit 801 to the NIC unit 811.

A network printing is a function for processing performed via a data processing path from the NIC unit 811, then to the RIP unit 803, then to the output image processing unit 804, and then to the printer unit 805.

A scanning to an external apparatus is a function for processing performed via a data processing path from the input image processing unit 801 to the dedicated I/F unit 810.

A printing from an external apparatus is a function for processing performed via a data processing path from the dedicated I/F unit 810, then to the output image processing unit 804, and then to the printer unit 805.

A scanning to an external memory is a function for processing performed via a data processing path from the input image processing unit 801 to the USB I/F unit 809.

A scanning from an external memory is a function for processing performed via a data processing path from the USB I/F unit 809, then to the RIP unit 803, then to the output image processing unit 804, and then to the printer unit 805.

A box scanning function is a function for processing performed via a data processing path from the input image processing unit 801, then to the output image processing unit 804, and then to the document management unit 807.

A box printing function is a function for processing performed via a data processing path from the document management unit 807 to the printer unit 805. Alternatively, the box printing function is a function for processing performed via a data processing path from the document management unit 807, then to the output image processing unit 804, and then to the printer unit 805.

A box receiving function is a function for processing performed via a data processing path from the NIC unit 811, then to the RIP unit 803, then to the output image processing unit 804, and then to the document management unit 807.

A box sending function is a function for processing performed via a data processing path from the document management unit 807 to the NIC unit 811.

A preview function is a function for processing performed via a data processing path from the document management unit 807 to the operation unit 802.

In addition to the functions described above, there are combinations of functions including various other functions such as an e-mail service function and a web server function. However, the description thereto is omitted here.

The box scanning function, the box printing function, the box receiving (or sending) function are the function for processing by the MFP by which data is written and read by using the document management unit 807. In addition, these functions are the function for inputting and outputting data in which a memory in the document management unit 807 is divided per each job or per each user so as to temporarily store the data, while using a combination of a user ID and a password.

In addition, the operation unit 802 is used for selecting various flows or functions and instructing an operation of the above functions. In this regard, as a display device of the operation unit 802 has a higher resolution, the operation unit 802 is capable of previewing image data stored in the document management unit 807 and printing the image data if the image data is confirmed as appropriate by the user.

<Operation Screen of MFP>

Figure 3:
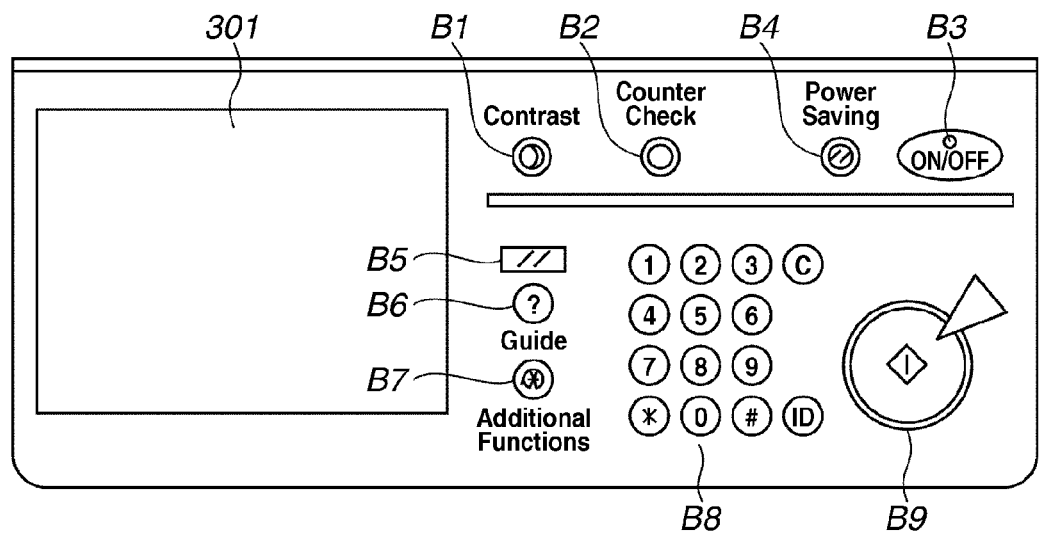
FIG. 3 illustrates an example of an operation unit of the MFP shown in FIG. 2.

FIG. 3 illustrates an example of the operation unit 802 of the MFP 107 shown in FIG. 2.

As shown in FIG. 3, the operation unit 802 includes an LCD 301 and hard keys such as numeral keys and power button. The LCD 301 includes a touch panel that displays a state of the MFP 107. In addition, the user can issue an instruction via the LCD 301.

An operation screen corresponding to each function that the MFP 107 implements is displayed on the LCD 301. The operation screen can be shifted to the next operation screen and the user can issue an instruction to the MFP 107 according to an input through the touch panel or the hard keys.

The operation unit 802 is capable of displaying a plurality of operation screens. The MFP 107 is capable of displaying the operation screen according to each operation (the operation for copying, facsimile, box input, and remote scanner). The user can select each operation by an operation of the buttons displayed on the touch panel or the hard keys.

In addition, the operation unit 802 is capable of displaying a state of processing of jobs by the MFP 107 and a state of the MFP 107 (e.g., a cover being opened or out of paper).

The hard keys include a contrast volume button B1, a counter-check button B2, a power button B3, a power-saving button B4, a reset button B5, a guide button B6, an additional function button B7, numeral keys B8, and an enter key B9. The contrast volume button B1 is used for changing a contrast of the LCD. The counter-check button B2 is used for displaying a counter screen. The power button B3 is used for switching on and off the apparatus. The power-saving button B4 is used for switching off the LCD only. The reset button B5 is used for canceling an operation. The guide button B6 is used for displaying a guide for the user. The additional function button B7 is used for shifting to a user mode (additional function) screen. The numeral keys B8 are used for inputting a numeral. The enter key B9 is used for starting copying or scanning. Information that is input through the hard keys is always updated by sending and receiving information to and from the job control unit 813. The screen is shifted according to a result of updating of the information.

<Production of Print Job>

Now, a description is made as to an operation for producing print job data based on electronic data stored in the disk 1207 performed by the PC 102 upon operation of the PC 102 by the user so as to send the produced print job data to the MFP 107.

When the user having an access authority (for browsing and printing) for an electronic document performs printing, upon instruction for printing by the user through the printer driver that is installed to the PC 102, the operation screen as shown in FIG. 4A is displayed by the PC 102. The processings to be performed thereafter differ per each type of job and are, therefore, separately described below per each type of job.

FIG. 4A and FIG. 4B each illustrate an operation screen of the printer driver that is installed on the PC 102. An operation screen 4000 is displayed on the CRT 1203 by the printer driver installed on the PC 102. The user operates the printer driver by pressing the buttons and the keys and inputting character strings by an operation through the keyboard 1204 and the pointing device 1205 via the operation screen 4000. Note that although FIG. 4A and FIG. 4B illustrate the same operation screen, a content of display in a window 4008 is not the same for the examples shown in FIG. 4A and FIG. 4B, because the content displayed in the window 4008 is changed by scrolling with a scroll bar 4010.

Referring to FIG. 4A, the operation screen 4000 includes three tabs, namely, a layout tab 4002, a paper/quality tab 4004, and a setting tab 4006. By using the three tabs, the user can switch between three operation screens. The operation screen that is displayed when the user presses the layout tab 4002 (this operation screen is not shown in the drawing) is a screen for setting a print layout. The operation screen that is displayed when the user presses the paper/quality tab 4004 (this operation screen is not shown in the drawing) is a screen for setting a paper size, a paper type, and a printing quality (such as a resolution) that are specified in a print job. The operation screen 4000 shown in each of FIG. 4A and FIG. 4B is displayed when the user presses the setting tab 4006.

The display in the window 4008 can be scrolled by operating the scroll bar 4010. The window 4008 is a display area for selecting and setting a printing method. An output destination specification field 4014 is used for selecting either one of three printing methods, namely, a "normal printing", a "box printing", and a "secured printing", by operating a spin box 4012. In the example shown in FIG. 4A, the secured printing is selected. In this case, an icon indicating a figure of a key, which indicates that the print job is a job to which the secured printing is specified, is displayed in a portion beside the output destination specification field 4014.

The "normal printing" is the printing method in which after the print job data that is sent by the PC 102 is received by the MFP 107, the data is printed out without being stored in the document management unit 807. In this regard, however, the document management unit 807 can temporarily store the print job data. In this case, after the printing is completed, the print job data or the image data that is produced by RIP-processing the print job data is deleted from the document management unit 807.

The "box printing" is the printing method in which after the print job data that is sent by the PC 102 is received by the MFP 107, the data is stored in the document management unit 807 without being printed out. The data that is stored in the document management unit 807 can be the print job data itself or the image data that is produced by RIP-processing the print job data. In addition, the data that is stored in the document management unit 807 can be an intermediate code that is produced in the course of converting the print job data into the image data. In the following description, the print job data that is yet to be RIP-processed, the image data that has been RIP-processed, and the intermediate code are collectively referred to as the "print job data". The print job data that is stored in the document management unit 807 by the box printing can be printed out or sent by facsimile by an operation through the operation unit 802 of the MFP 107 by the user.

The "secured printing" is the printing method in which the print job data that is sent by the PC 102 is not printed immediately after the print job data is received by the MFP 107, and is first stored in the document management unit 807 so as to be ready for being printed out. Then, when the user issues an instruction for printing by the operation through the operation unit 802, the stored print job data is printed out.

In box-printing or secured-printing electronic data to which a policy is provided, the policy that is the same as the policy provided to the electronic data can be applied to print job data that is stored in the document management unit 807. This is to be described in detail later below.

A box number specification field 4016 is a field in which the user can enter information when the user selects the box printing via the output destination specification field 4014. When the user selects a printing method other than the box printing, the box number specification field 4016 is displayed in a gray-out state so as not to accept any entry. The user specifies information for specifying a storage area in the document management unit 807 for storing the print job data when the box printing is performed, through the box number specification field 4016. In this exemplary embodiment, one hundred storage areas, which are serially provided with numbers from "0" to "99", are prepared in the document management unit 807 as the area for a box. The user who instructs the box printing to be performed specifies a desired area in the document management unit 807 by entering any of the numbers from "0" to "99".

A confirmatory printing check box 4018 is a field in which the user can enter information when the user selects the box printing through the output destination specification field 4014. When the user selects a printing method other than the box printing, the confirmatory printing check box 4018 is displayed in a gray-out state so as not to accept any entry. When the user selects the box printing through the output destination specification field 4014 and checks the confirmatory printing check box 4018, the MFP 107 stores the print job data in the document management unit 807 and performs printing based on the print job data. On the other hand, when the user does not check the confirmatory printing check box 4018, the MFP 107 stores the print job data in the document management unit 807. At this time, the data is not printed out.

A window 4020 displays the content of the setting such as the paper size that is set through a setting screen (not shown), which is displayed upon pressing of the paper/quality tab 4004 by the user. In addition, a window 4022 displays an outline of the print layout that is set through a setting screen (not shown), which is displayed upon pressing of the layout tab 4002 by the user.

Referring to FIG. 4B, the window 4008 displays security settings that include items that are further set in performing the box printing or the secured printing. When the user selects the normal printing through the output destination specification field 4014, the items are displayed in a gray-out state so as not to accept any entry.

A secure password entry field 4025 is a field in which the user can enter information when the user selects the secured printing through the output destination specification field 4014. The user enters in the secure password entry field 4025 a secure password (hereinafter simply referred to as a "password") that is created by using a combination of numbers and characters that the user desires by an operation of the keyboard 1204. The method of using the password entered here is to be described in detail later below.

A policy server name field 4028, a registered user name field 4030, and a registered policy name field 4032 are fields in which the user can enter information in printing the electronic data to which the policy is provided or in newly providing by the printer driver the policy to the electronic data that is not provided with a policy yet.

The policy server name field 4028 is a field in which, when the policy is provided to the electronic data to be printed, the user can enter information for identifying a policy server (namely, an IP address or a host name) that manages the policy data. In this exemplary embodiment, in printing electronic data shown in FIG. 15, the printer driver acquires information described in the policy server identification information 1504, and then automatically sets the information to the policy server name field 4028 as default information. The default information that the printer driver sets can be changed by the user.

The registered user name field 4030 is a field in which the user can enter information for identifying the user (for example, a user ID) who is not authorized for printing or browsing according to the policy provided to the electronic data to be printed and who is to be newly provided with an authority for browsing or printing by the MFP 107. A plurality of user IDs can be entered in the registered user name field 4030.

The registered policy name field 4032 is a field in which the user can enter the policy ID 1301 managed by the policy server 106 and/or the policy name 1302 corresponding to the policy ID 1301, which is used to add an authority for browsing or printing to the user ID entered in the registered user name field 4030. The printer driver, in printing the electronic data shown in FIG. 15, acquires the document ID 1503 and makes an inquiry to the policy server 106. Then, the printer driver receives the policy ID 1301 and/or the policy name 1302 that corresponds to the document ID 1503, which are returned from the policy server 106, and sets the received policy ID 1301 and/or the policy name 1302 to the registered policy name field 4032 as default.

In addition, the printer driver acquires from the policy server 106 a list of the policy IDs and/or the policy names that the policy server 106 manages so as to display the list in the registered policy name field 4032 as a pull-down menu. In addition, the user can select a desired policy ID from the pull-down menu.

In addition, when the policy is not provided to a document to be printed, the policy can be provided to the print job data that the printer driver produces, by the user by entering a setting value to each of the policy server name field 4028, the registered policy name field 4032, and, as necessary, the registered user name field 4030. A detailed description as to this operation is to be made later below.

When the user presses an OK button 4024, the printer driver produces print job data based on the content that is set through the operation screen 4000, and then sends the print job data to the MFP 107. The print job data that is sent here includes data that is obtained by converting the electronic data to be printed into a page description language (PDL) format and information that indicates the setting content that is set through the operation screen 4000. On the other hand, when the user presses a cancel button 4026, the printer driver cancels the content that is set through the operation screen 4000. In this exemplary embodiment, the printer driver that is installed on the PC 102 produces a page description language based on an electronic document. However, the printer driver can produce bitmap image data based on the electronic document.

In addition, the printer driver accesses a policy server that is identified by the information entered in the policy server name field 4028 and, then, requests the policy server to add an authority for browsing or printing to the policy ID that is identified by the entered information in the registered policy name field 4032 with respect to the user ID entered in the registered user name field 4030. Thus, in the case of printing by the printer driver, the user who is to be authorized for printing or browsing can be added.

<Operation through Printer Driver>

Now, a description is made as to the operation of the PC 102 by the user in a case where the user instructs a production of a print job by an operation through a printer driver screen, with reference to FIG. 4A and FIG. 4B. Note that in the description below, the settings performed through each operation screen by pressing the layout tab 4002 or the paper/quality tab 4004 are already performed. In the description below, the setting items in the operation screen that is performed by an operation of the setting tab 4006 are described.

<Secured Printing of Electronic Data to which Policy is Provided>

(1) In FIG. 4A, the user selects the secured printing in the output destination specification field 4014.

(2) In FIG. 4B, the user enters the password in the secure password entry field 4025. The entry of the password is not necessarily performed.

(3) When the policy is provided to the electronic data to be printed, policy server identification information that is included in the electronic data is set to the policy server name field 4028 as default information. In changing the policy server as the user desires, the user enters an IP address of a policy server to be set. If the PC 102 and the MFP 107 can access the same policy server, the value for the policy server name field 4028 does not have to be changed from the default value. On the other hand, in the case of an environment in which the PC 102 and the MFP 107 can access only mutually different policy servers, the user enters the IP address of the policy server that the MFP 107 can access.

(4) In the case of adding a user who is not authorized for printing according to the policy that is provided to the electronic data, to the policy as the user authorized for printing, the user enters the user ID of the user in the registered user name field 4030 and also enters the policy ID 1301 or the policy name 1302 in the registered policy name field 4032. A policy ID 1301 or a policy name 1302 linked to the electronic data to be printed can be set to the registered policy name field 4032 as a default value.

(5) When the above settings are completely performed, the user presses the OK button 4024.

<Secured Printing of Electronic Data to which Policy is not Provided>

Now, a description is made as to the secured printing of the electronic data to which the policy is not provided.

(1) The user selects the secured printing as the output destination.

(2) Then, the user enters the secure password.

(3) When the policy is not to be newly provided to the electronic data by the printer driver, the user presses the OK button 4032. On the other hand, when the policy is newly provided to the electronic data by the printer driver, the user performs the setting to the policy server name field 4028 and the registered policy name field 4032. In this case, the printer driver can previously store the IP address and the like of the policy server 106 and the information of the IP address and the like can be set to the policy server name field 4028 as a default value. In addition, the registered policy name field 4032 can acquire a list of the policy IDs and/or the policy names and display the acquired policy IDs and the policy names as a pull-down menu for selection by the user.

<Box Printing>

Hereinbelow, a method for the box printing is described.

(1) The user selects the box printing in the output destination specification field 4014 through the operation screen shown in FIG. 4A.

(2) Then, the user enters a box number in the box number specification field 4016. Then, the user checks the confirmatory printing check box 4018 as necessary.

After that, the user performs a setting as to the policy through the operation screen shown in FIG. 4B. The description thereof is omitted here because the operation for the setting as to the policy is similar to that in the case of the secured printing.

<Print Job Production Processing by PC 102>

Figure 5:
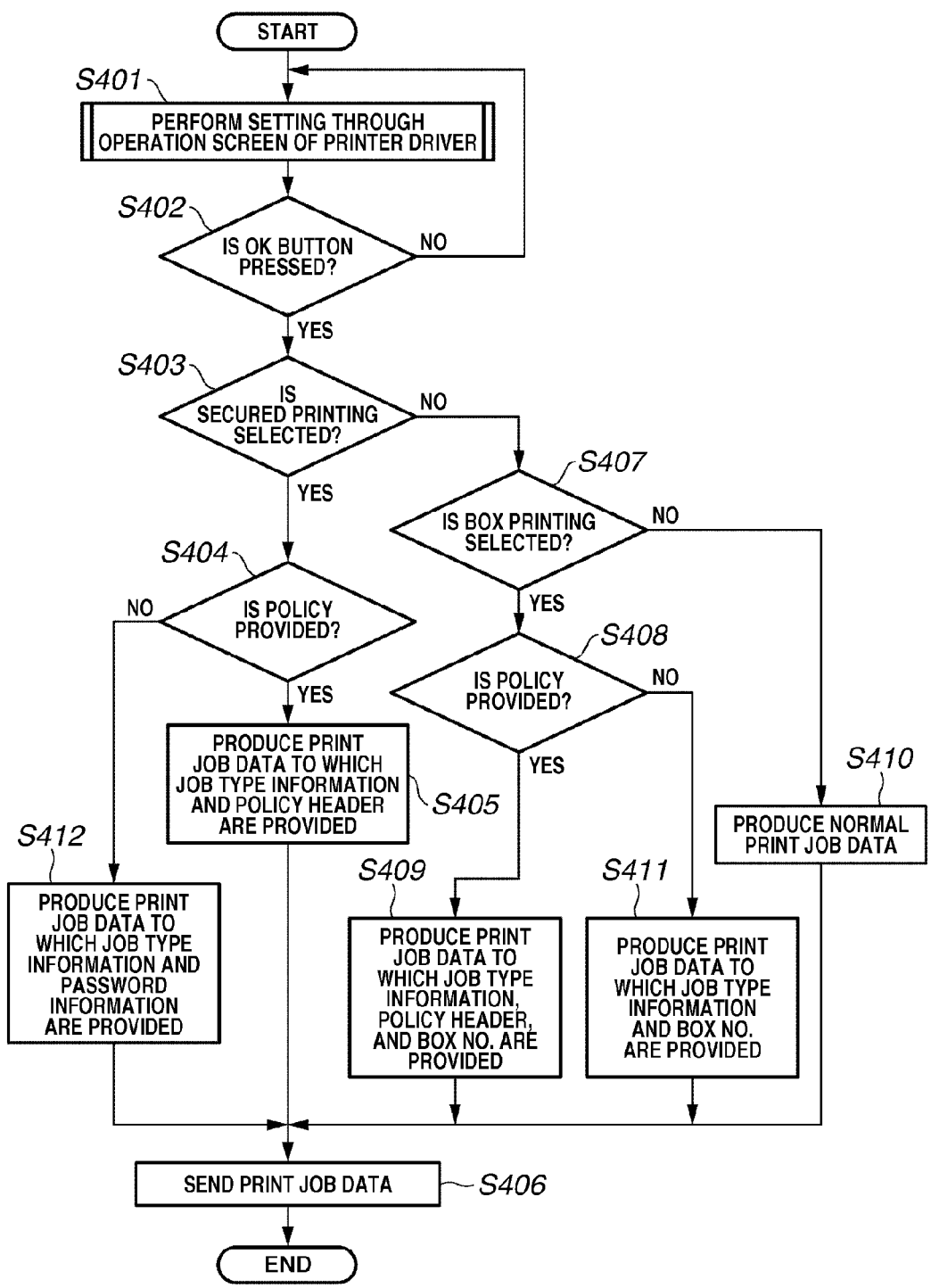
FIG. 5 is a flow chart that illustrates a procedure for data processing by the data processing apparatus according to an exemplary embodiment of the present invention.

FIG. 5 is a flow chart that illustrates a procedure for data processing by the PC 102 according to this exemplary embodiment. This processing corresponds to the procedure for the data processing at the time of input of a job. Each step is implemented in a manner such that the CPU 1201 of the PCs 102 through 105 loads the program of the printer driver to the RAM 1202 so as to execute the program.

First, in step S401, the CPU 1201 receives an instruction, which is generated by an operation by the user, for various settings for the print job.

Figure 16:
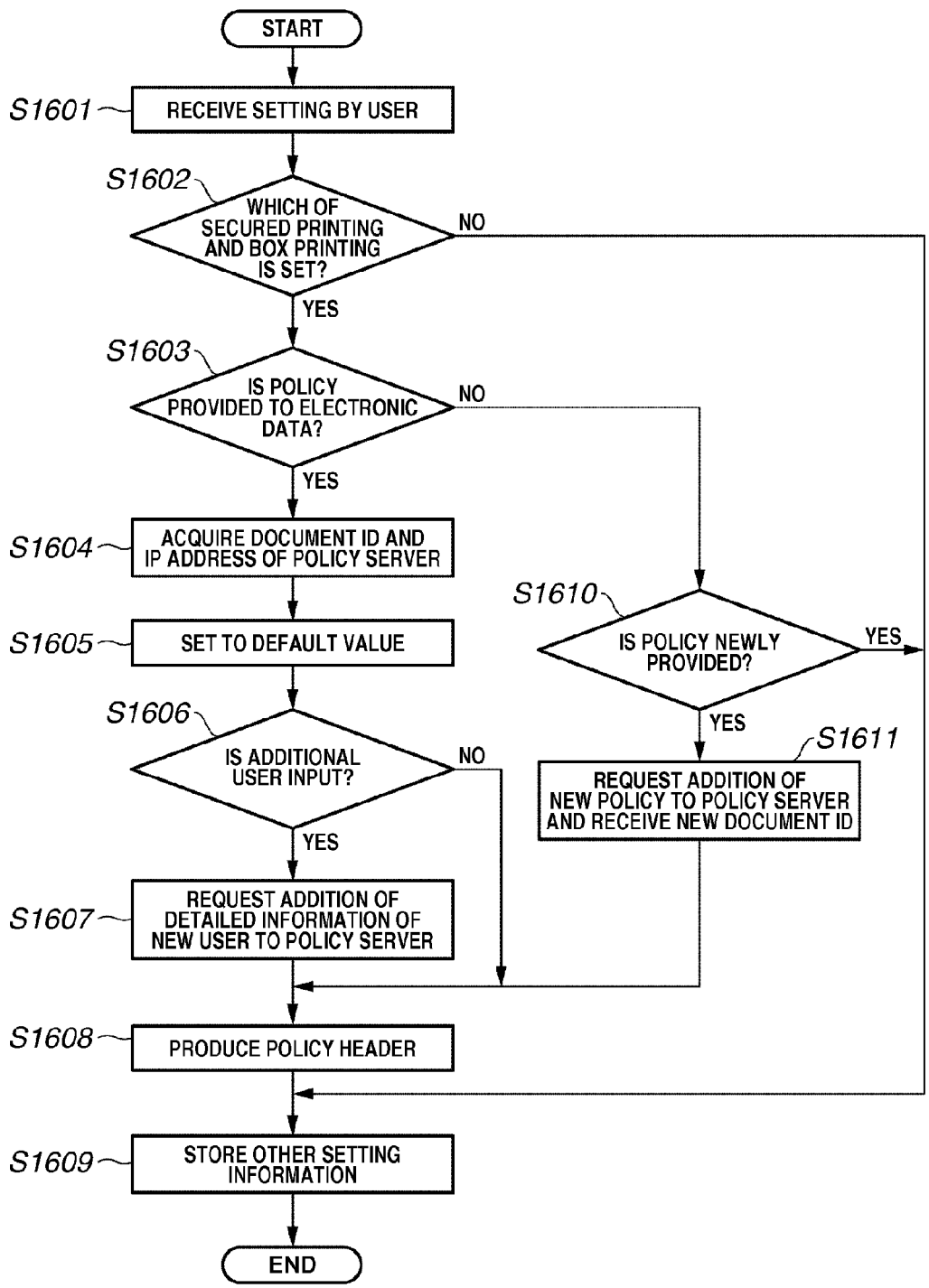
FIG. 16 is a flow chart that illustrates a detailed operation in step S401 shown in FIG. 5.

FIG. 16 is a flow chart that illustrates a detailed operation in step S401 shown in FIG. 5. In step S1601, the CPU 1201 receives the various settings that the user inputs through the operation screen 4000 of the printer driver.

In step S1602, the CPU 1201 determines whether the information that the user sets to the output destination specification field 4014 is either one of the secured printing and the box printing.

If it is determined that the information that the user sets to the output destination specification field 4014 is either one of the secured printing and the box printing, the processing advances to step S1603. In step S1603, the CPU 1201 determines whether the electronic data to be printed is provided with the policy. On the other hand, if it is determined that the information that the user sets to the output destination specification field 4014 is neither the secured printing nor the box printing, the processing advances to step S1609.

If, as a result of the determination in step S1603, it is determined that the policy is provided to the electronic data, the processing advances to step S1604. In step S1604, the CPU 1201 acquires, from the electronic data to be printed, the document ID 1503 and the policy server identification information 1504 for identifying the policy server such as the IP address of the policy server. In addition, in step S1604, the CPU 1201 accesses the policy server 106 according to the acquired information so as to acquire the policy ID and/or the policy name corresponding to the document ID 1503, from the policy server 106.

Then, the processing advances to step S1605. In step S1605, the CPU 1201 sets the acquired policy server identification information 1504 and the acquired policy ID and/or the policy name to the policy server name field 4028 and the registered policy name field 4032, respectively, as a default value. At this time, if the user enters information for a change in the default value, the CPU 1201 receives the change.

In step S1606, the CPU 1201 determines whether the user ID is input to the registered user name field 4030. If, as a result of the determination in step S1606, it is determined that the user ID is not input to the registered user name field 4030, the processing advances to step S1608.

If, as a result of the determination in step S1606, it is determined that the user ID is input to the registered user name field 4030, the processing advances to step S1607. In step S1607, the printer driver accesses the policy server 106 and requests the policy server 106 to add to the policy ID, which is identified by the policy server name field 4028, authority information that gives an authority for browsing and printing to the user ID that is input to the registered user name field 4030. Upon receiving of the request, the policy server 106 adds authority information that gives an authority for browsing and printing to the user specified for the policy ID in the policy information (FIG. 13) that is stored in the disk 1207. In this exemplary embodiment, the authority for browsing and printing is given. However, the authority for printing only can be given. Note that when the authority for browsing is given, the print job data corresponding to the electronic data can be previewed by the MFP 107. When the authority for printing is given, the print job data corresponding to the electronic data can be printed by the MFP 107.

Then, in step S1608, the CPU 1201 produces a policy header 1703. The policy header 1703 is to be described in detail later below with reference to FIG. 17. To briefly describe the policy header 1703 here, the policy header 1703 includes information concerning the policy included in print job data 1700. The policy header 1703 includes the document ID 1503, which is acquired from the electronic data to be printed, and the policy server identification information 1504. With the document ID 1503 and the policy server identification information 1504 being included, the policy provided to the electronic data can be inherited by the print job data.

In step S1609, other print setting information that is set through the screen shown in FIG. 4A is temporarily stored while being linked to the print job. Then, the processing ends.

If it is determined in step S1603 that the policy is not provided to the electronic data to be printed, the processing advances to step S1610. In step S1610, the CPU 1201 determines whether the policy is to be newly provided to the electronic data to be printed. This determination is made based on whether any information is input to the policy server name field 4028 or the registered policy name field 4032. If any information is input to the policy server name field 4028 or the registered policy name field 4032, the CPU 1201 determines that the policy is to be newly provided to the electronic data to be printed, and the processing advances to step S1611. If no information is input to the policy server name field 4028 or the registered policy name field 4032, the processing advances to step S1609.

In step S1611, the CPU 1201 accesses the policy server 106 so as to notify the policy ID entered in the registered policy name field 4032 and request the policy server 106 to add the policy to the print job data to be produced. Upon request for adding the policy, the policy server 106 produces a new document ID and links the produced document ID with the policy ID received from the PC 102. Then, the CPU 1201 notifies the new document ID to the printer driver of the PC 102. Then, the processing advances to step S1608. In step S1608, when the policy is newly provided to the print job data, the CPU 1201 sets the new document ID received from the policy server 106 to the policy header 1703.

Now, a description returns to the processing in the flow chart shown in FIG. 5.

In step S402, the CPU 1201 determines whether the OK button 4024 shown in FIG. 4A and FIG. 4B is pressed. If it is determined that the OK button 4024 is not pressed in step S402, the processing returns to step S401. If it is determined that the OK button 4024 is pressed in step S402, the processing advances to step S403.

In step S403, the CPU 1201 determines whether the print job is the secured printing. If it is determined that the print job is the secured printing, the processing advances to step S404.

In step S404, the CPU 1201 determines whether the policy is provided to the electronic data to be printed or to the print job data. If it is determined that the policy is provided to the electronic data to be printed or to the print job data, the CPU 1201 advances the processing to step S405 so as to produce the print job data.

Figure 17:
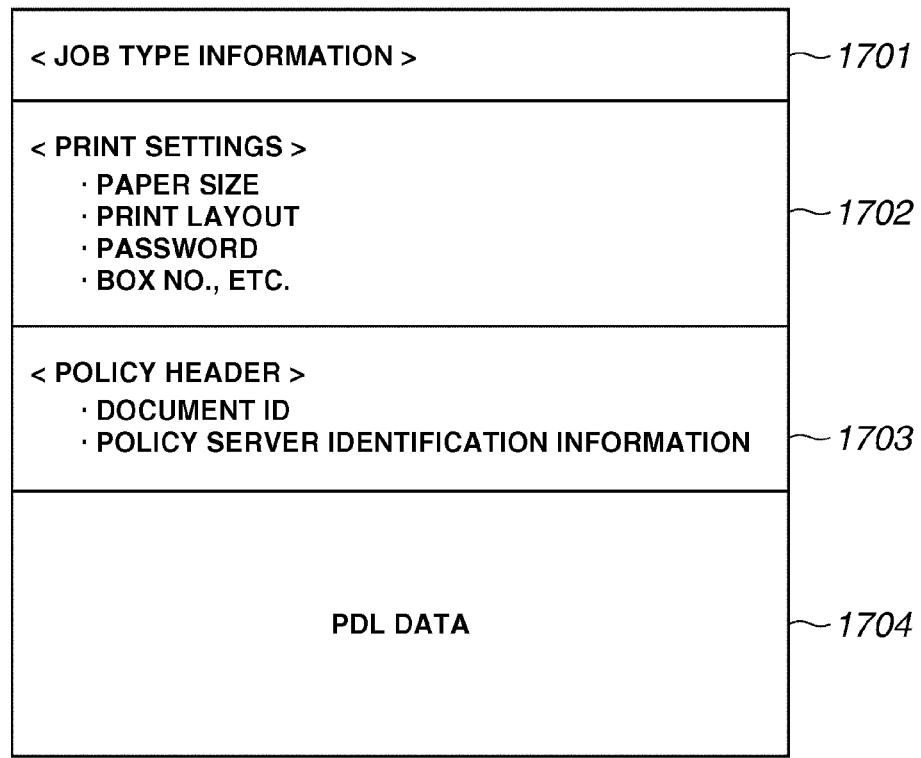
FIG. 17 illustrates an example of print job data.

FIG. 17 illustrates an example of the print job data according to this exemplary embodiment.

The print job data 1700 is produced in steps S405, S409, S410, S411, and S412. The print job data 1700 includes job type information 1701, a print setting 1702, a policy header 1703, and PDL data 1704.

The job type information 1701 includes information that indicates a type of the print job for the print job data 1700. In this exemplary embodiment, for the type of the print job, there are three types of print jobs, namely, the normal printing, the box printing, and the secured printing. The information indicating a type of the print job for the print job data 1700 is based on the information set to the output destination specification field 4014 shown in FIG. 4A.

The print setting 1702 includes various setting information included in the print job, which is specified by the user through the screen shown in FIG. 4A. That is, the print setting 1702 includes the paper size, the print layout, the password that can be set in the case of the secured printing, and the box number that can be set in the case of the box printing.

The policy header 1703 is a header that is provided in the case of the secured printing or the box printing when the policy is provided to the electronic data to be printed or when the policy is newly provided to the print job data. The policy header 1703 includes the document ID and the policy server identification information.

The PDL data 1704 is data that indicates the content of the electronic data to be printed.

Now, a description returns again to the flow chart shown in FIG. 5.

The print job data that is produced in step S405 includes the policy header 1703 as shown in FIG. 17. The job type information 1701 includes information indicating the secured printing.

Then, the processing advances to step S406. In step S406, the CPU 1201 sends the print job data produced in step S405 to the MFP 107.

On the other hand, if, in step S404, it is determined that the policy is not provided to the electronic data, the processing advances to step S412.

In step S412, the print job data 1700 is produced. Here, the print job data 1700 includes information indicating the secured printing for the job type information 1701 and also includes at least the password for the print setting. The print job data that is produced in step S412 does not include a policy header.

If, in step S403, it is determined that the print job is not the secured printing, the processing advances to step S407. In step S407, the CPU 1201 determines whether the print job is the box printing. If, in step S407, it is determined that the print job is the box printing, the processing advances to step S408. In step S408, the CPU 1201 determines whether the policy is provided to the electronic data to be printed or the print job data. If it is determined that the policy is provided to the electronic data to be printed or the print job data, the processing advances to step S409. In step S409, the CPU 1201 produces the print job data that includes information indicating the box printing for the job type information, at least a box number set for the print setting, and a policy header. On the other hand, if it is determined in step S408 that the policy is not provided to the electronic data to be printed or the print job data, the processing advances to step S411. In step S411, the CPU 1201 produces the print job data that includes information indicating the box printing for the job type information, and at least a box number set for the print setting, which does not include a policy header.

If, in step S407, it is determined that the print job is not the box printing, the processing advances to step S410. In step S410, the CPU 1201 determines that the print job is the normal printing and produces the print job data. The print job data that is produced here includes information indicating the normal printing for the job type information 1701 and does not includes a policy header.

Then, in step S406, the CPU 1201 sends the print job data produced in step S405, S409, S410, S411, or S412 to the MFP 107, and then the processing ends.

According to the above-described processing performed by the PC 102, in the case where the policy is provided to the electronic data to be printed, the policy can be inherited to the print job data that is produced based on the electronic data.

In addition, the setting can be performed through the printer driver so that the authorization for browsing (reading) and/or printing can be given to a user other than the user who is authorized by the policy. In addition, the setting can be reflected to the policy server 106.

In addition, with the printer driver and the policy server 106 operating in cooperation with each other, the policy can be newly provided to the electronic data that is not provided with a policy yet.

Thus, the management of the authority to access electronic data can be sufficiently performed by the image processing apparatus such as an MFP, and accordingly, the security for the electronic data can be improved.

In addition, the policy can be added and changed by the operation of the printer driver by the user, and accordingly, the printing and the setting for adding and changing the policy can be performed at once through the printer driver. Thus, a user's convenience can be improved.

<Operation for Outputting Print Job by MFP 107>

Now, the processing of the print job data received by the MFP 107 is described with reference to FIG. 6A, FIG. 6B, FIG. 6C, FIG. 7A, FIG. 7B, and FIG. 7C.

Figure 6A:
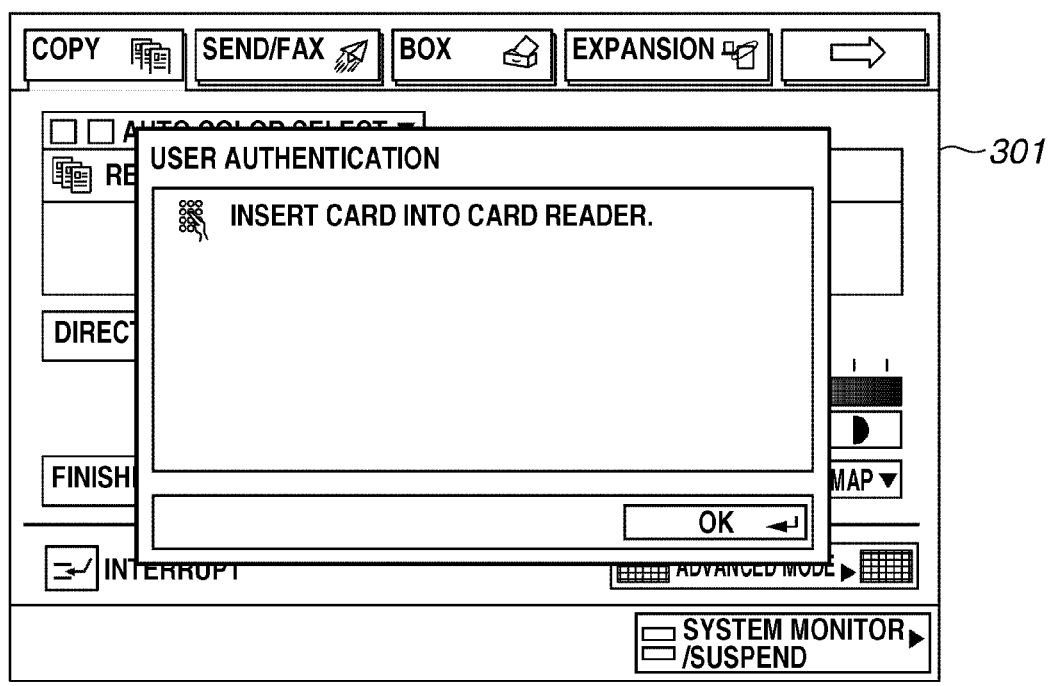
FIG. 6A illustrates an example of a user interface screen that indicates a state of a job that is input to a document management unit of the MFP shown in FIG. 1.
Figure 6B:
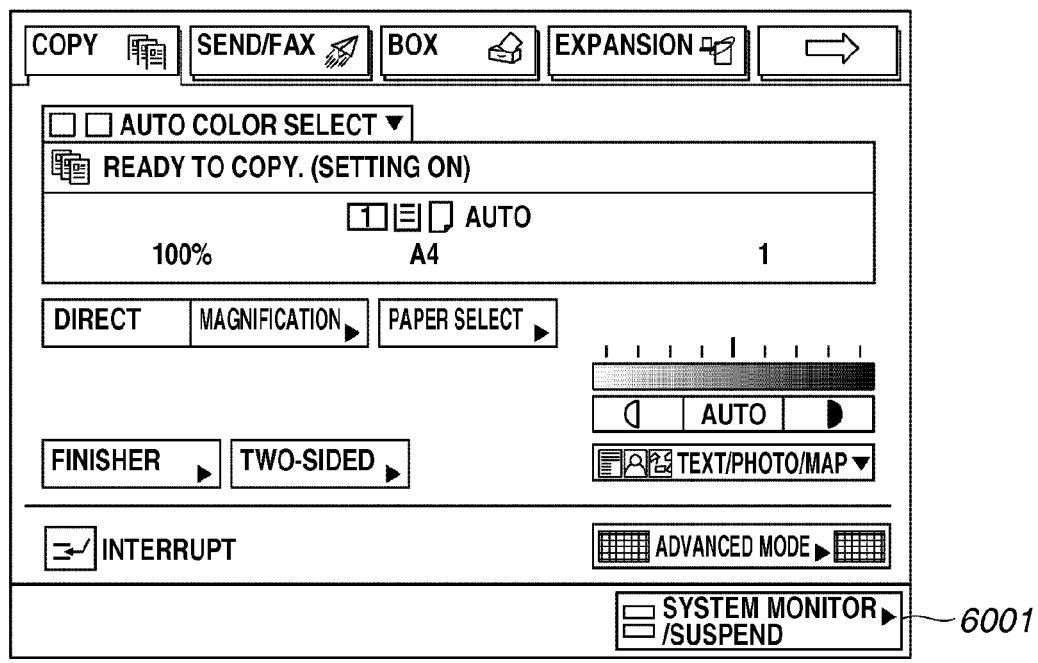
FIG. 6B illustrates an example of a user interface screen that indicates a state of a job that is input to the document management unit of the MFP shown in FIG. 1.
Figure 6C:
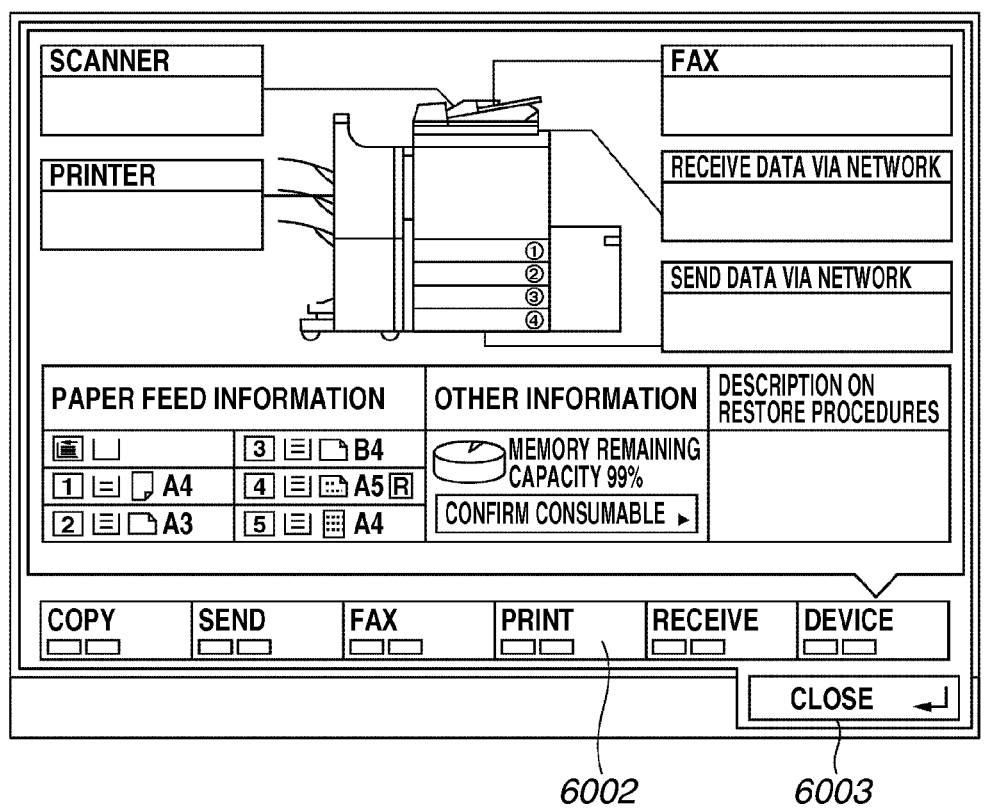
FIG. 6C illustrates an example of a user interface screen that indicates a state of a job that is input to the document management unit of the MFP shown in FIG. 1.

FIGS. 6A, 6B, and 6C each illustrate an example of a display by the operation unit 802 of the MFP 107 according to this exemplary embodiment.

FIG. 6A illustrates the content of the display by the operation unit 802 after the MFP 107 is activated. When the user inserts an IC card that stores information for identifying the user into the card reader 815, the MFP 107 performs user authentication. When the MFP 107 confirms that the user is an authorized user, the screen shifts to a normal screen shown in FIG. 6B. The user authentication performed by the MFP 107 can be the authentication using a publicly known user authentication technique. In this exemplary embodiment, the user authentication using an IC card is employed. However, the user authentication can be performed in a manner such that the user inputs the user ID and the password through the operation unit 802. Alternatively, a method using biometrics can be applied.

FIG. 6B illustrates a normal screen of the operation unit 802. Referring to FIG. 6B, when the user presses a system monitor/suspend button 6001, the display screen of the operation unit 802 shifts to a screen shown in FIG. 6C. FIG. 6C illustrates a status confirmation screen for confirming a status of the MFP 107.

In the example shown in FIG. 6C, when the user presses a "close" button 6003, the screen returns to the screen shown in FIG. 6B. On the other hand, when the user presses a "print" button 6002 in the screen shown in FIG. 6C, the screen shifts to a display screen shown in FIG. 7A.

Figure 7A:
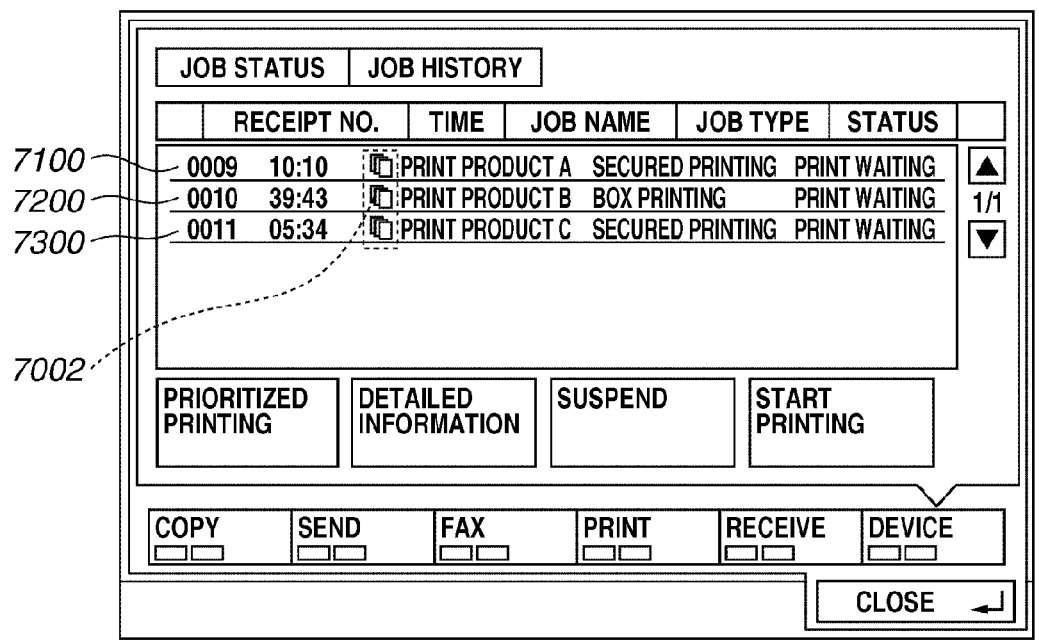
FIG. 7A illustrates an example of a user interface screen that indicates a state of a job that is input to the document management unit of the MFP shown in FIG. 1 and whose secured printing is requested.
Figure 7B:
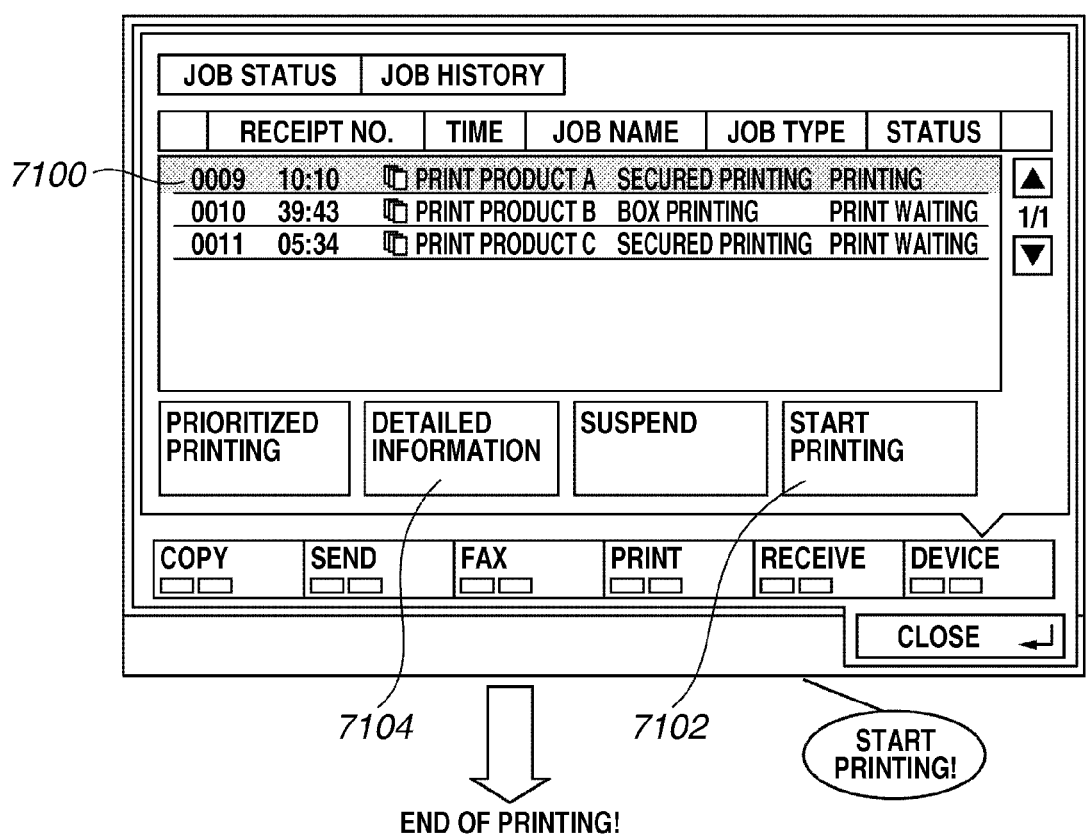
FIG. 7B illustrates an example of a user interface screen that indicates a state of a job that is input to the document management unit of the MFP shown in FIG. 1 and whose secured printing is requested.

FIG. 7A, FIG. 7B, and FIG. 7C each illustrate an example of a print job list screen that indicates a state of the secured printing or the box printing that the MFP 107 receives.

The screen shown in FIG. 7A is displayed when the user presses the "print" button 6002 in the screen shown in FIG. 6C.

Referring to FIG. 7A, print jobs 7100, 7200, and 7300 indicate print jobs that are stored in the document management unit 807 such as the secured printing and the box printing, among the print jobs that the MFP 107 receives.

An icon 7002 is displayed with respect to each print job. The user discriminates and recognizes the type of the print job by looking at the icon.

FIG. 8 illustrates a detailed example of the icon 7002 according to this exemplary embodiment. An icon 8002 indicates that the print job is a secured printing job that includes a policy header. An icon 8004 indicates that the print job is a secured printing job that does not include a policy header. An icon 8006 indicates that the print job is a box printing job that includes a policy header. An icon 8008 indicates that the print job is a box printing job that does not include a policy header.

In the print job list screen shown in FIG. 7A, when the user selects either one of the print jobs, an item indicating the selected print job is displayed in a highlighted (reversed) manner as shown in FIG. 7B. Then, the user presses a print start button 7102 so as to instruct the start of the printing of the selected print job.

When the job control unit 813 of the MFP 107 receives the pressing of the print start button 7102, the job control unit 813 performs control differently depending on the type of the print job instructed for printing by the user.

If the print job instructed for printing by the user is either the secured printing that includes a policy header or the box printing that includes a policy header, the job control unit 813 accesses the policy server 106 via the NIC unit 811 based on the policy server identification information that is included in the policy header. Then, the job control unit 813 sends the document ID and the user ID of the user who is authorized through the screen shown in FIG. 6A to the policy server 106. The policy server 106 refers to the policy information (FIG. 13 and FIG. 14) based on the document ID and the user ID received from the MFP 107 so as to identify the authority that is given to the user having the user ID included in the specified policy ID. Then, the policy server 106 sends the identified authority information to the MFP 107.

Then, the job control unit 813 of the MFP 107 refers to the authority information sent from the policy server 106. If the printing is authorized for the user, the job control unit 813 starts the printing. On the other hand, if the printing is not authorized for the user, the job control unit 813 does not perform the printing and displays an error message (not shown) via the operation unit 802.

When the user presses a detailed information button 7104 after selecting the print job through the screen shown in FIG. 7B, a preview screen of the selected print job can be displayed on the operation unit 802. In this case also, if the print job whose preview is instructed is a print job including a policy header, the job control unit 813 of the MFP 107 acquires authority information from the policy server 106 in a similar manner as described above. Then, the job control unit 813 refers to the authorization for browsing so as to determine whether the browsing is authorized for the user. Depending on the result of this determination, the job control unit 813 displays a preview or inhibits a preview.

If the print job whose printing is instructed to be started is the secured printing that does not include a policy header, the job control unit 813 extracts the password that is included in the print job data. Then, the job control unit 813 displays a screen shown in FIG. 7C so as to request the user to enter the password. Then, if the password that is entered by the user via the operation unit 802 and the password extracted from the print job data match each other, the job control unit 813 permits the printing to be started and allows the print job to be printed by the printer unit 805. If the password that is entered by the user via the operation unit 802 and the password extracted from the print job data does not match each other, the job control unit 813 displays an error message (not shown) on the operation unit 802.

If the print job whose printing is instructed to be started is the box printing that does not include a policy header, the job control unit 813 allows the print job to be printed by the printer unit 805.

<Processing by MFP 107>

Figure 9:
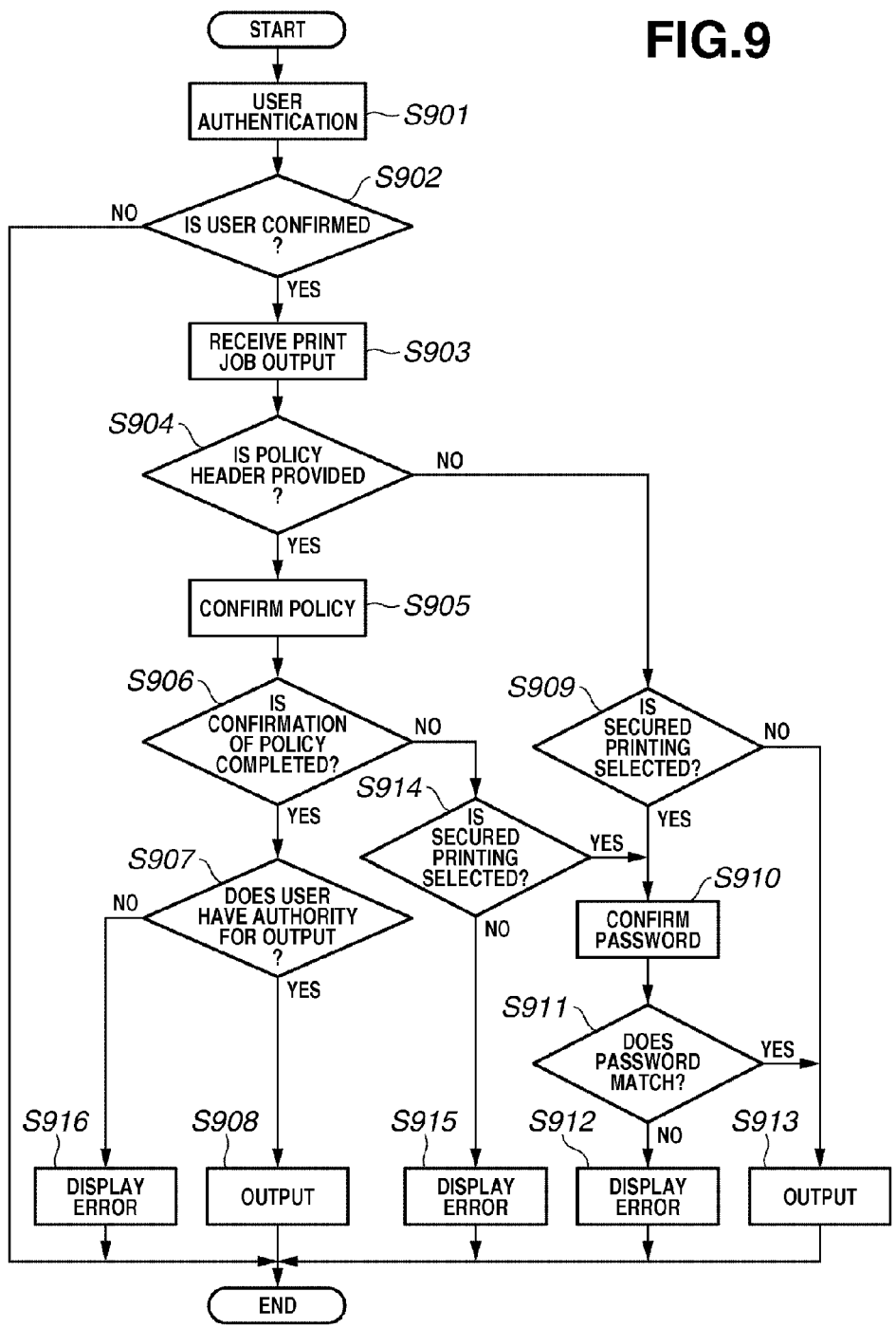
FIG. 9 is a flow chart that illustrates an example of processing performed by the image processing apparatus according to an exemplary embodiment of the present invention.

FIG. 9 is a flow chart that illustrates an example of processing by the image processing apparatus according to an exemplary embodiment of the present invention. Each step of the processing in this flow chart is implemented in a manner such that the job control unit 813 of the MFP 107 loads various control programs stored in the resource management unit 806 into an internal memory so as to execute the programs.

First, in step S901, the user inserts an IC card that the user carries, into a personal identification device such as the IC card reader 815. Thus, the job control unit 813 acquires personal information that is registered to the card (the user ID and the like) from the IC card. Note that the card can be a normal magnetic card or a noncontact IC card, instead of the IC card. In addition, a user authentication method that does not use a card (a method such as biometrics or a method in which the user enters the user ID and the password via the operation unit 802) can be applied. In addition, the user authentication can be performed in cooperation with an external directory server (not shown).

In step S902, the job control unit 813 checks if the user is an authorized user authorized for using the MFP 107 based on the acquired user ID. If it is confirmed that the user is an authorized user, the processing advances to step S903. If it is determined that the user is not an authorized user, the processing ends.

In step S903, the job control unit 813 receives the pressing of the system monitor/suspend button 6001 shown in FIG. 6B by the user. Then, the job control unit 813 shifts the screen to a screen shown in FIG. 7A so as to receive the outputting of a print job that the user selects from the list of print jobs. Here, the "outputting" includes both a print output and a preview output.

Then, in step S904, the job control unit 813 determines whether the policy header 1703 is provided to the print job data selected by the user. If it is determined in step S904 that the policy header 1703 is not provided to the print job data, the processing advances to step S909.

On the other hand, if it is determined in step S904 that the policy header 1703 is not provided to the print job data, the processing advances to step S905.

In step S905, the job control unit 813 extracts the document ID and the policy server identification information included in the policy header 1703. Then, the job control unit 813 accesses the policy server 106 based on the extracted policy server identification information and sends the extracted document ID to the policy server 106. The policy server 106 refers to the policy information (FIG. 13 and FIG. 14) based on the document ID received from the MFP 107 and the user ID of the user who is authorized by the user authentication in step S901. Then, the policy server 106 identifies the policy ID that is associated with the document ID and identifies an authorization given to the user having the user ID with respect to the identified policy ID. Then, the policy server 106 sends the identified authority information to the MFP 107.

In step S906, the job control unit 813 checks if the access to the policy server 106 is normally performed and if the authority information corresponding to the sent document ID is received. For example, if the MFP 107 cannot communicate with the policy server 106 due to a failure in the network 101 or a failure in the policy server 106, the job control unit 813 cannot confirm the policy because the job control unit 813 cannot acquire the authority information. In addition, if the content included in the policy header 1703 is destructed due to any cause, the MFP 107 cannot access the policy server 106, and accordingly, the job control unit 813 cannot confirm the policy. If, in step S906, it is determined that the confirmation of the policy cannot be performed, the processing advances to step S914. On the other hand, if, in step S906, it is determined that the policy has been normally performed, the processing advances to step S907.

In step S907, the job control unit 813 confirms the authority information acquired from the policy server 106 in step S905 so as to check if the authorized user has an authority for outputting. If the instruction for outputting by the user is issued for the print output, the job control unit 813 can check the print authority among the authority information. If the instruction for outputting by the user is issued for the preview output, the job control unit 813 can check the reading (browsing) authority among the authority information. If, as a result of checking the authority information, it is determined that the authorization for outputting is given to the authorized user, the processing advances to step S908. In step S908, the job control unit 813 performs the outputting (the print output or the preview display) instructed by the user, and then the processing ends. On the other hand, if it is determined that the authority for outputting is not given to the authorized user, the job control unit 813 does not perform the operation for outputting instructed by the user. Then, the job control unit 813 displays an error message indicating that the user is not authorized for the outputting on the operation unit 802 (step S916), and then the processing ends.

If, in step S904, it is determined that the policy header 1703 is not included in the print job, the processing advances to step S909. In step S909, the job control unit 813 checks whether the print job whose outputting is instructed by the user is the secured printing. If it is determined that the print job is not the secured printing, the processing advances to step S913. In step S913, the job control unit 813 outputs the print job (by print output or display output), and then the processing ends. On the other hand, if it is determined that the print job is the secured printing, the processing advances to step S910.

If the policy cannot be confirmed in step S906, the processing advances to step S914. In step S914, the job control unit 813 checks whether the print job whose outputting is instructed by the user is the secured printing. If it is determined that the print job is not the secured printing, the job control unit 813 displays on the operation unit 802 a message indicating that the policy cannot be confirmed (step S915), and then the processing ends. On the other hand, if it is determined that the print job is the secured printing, the processing advances to step S910.

In step S910, the job control unit 813 confirms the password because the print job is the secured printing. The job control unit 813 displays on the operation unit 802 the password entry request screen as shown in FIG. 7C and then confirms the password entered by the user.

In step S911, the job control unit 813 checks whether the entered password and the password included in the print setting 1702 of the print job data match each other. If it is determined that the entered password and the password included in the print setting 1702 of the print job data match each other, the processing advances to step S913. In step S913, the job control unit 813 outputs the print job (by print output or preview display), and then the processing ends. On the other hand, if the entered password and the password included in the print setting 1702 of the print job data do not match each other, the job control unit 813 displays on the operation unit 802 a message indicating that the entered password is wrong (step S912), and then the processing ends. Here, the job control unit 813 may displays on the operation unit 802 the password entry request screen shown in FIG. 7C again so as to prompt the user to enter a correct password, instead of ending the processing.

According to the above-described operation of the MFP 107, in the case where the print job stored in the document management unit 807 is provided with the policy header 1703, the control as to the permission/inhibition of outputting is performed according to the policy. Thus, the policy for the electronic data from which the print job data is produced can be reflected to the operation of the MFP 107, thus improving the security for the electronic data. In addition, by providing the password to the print setting 1702 of the print job data, the printing is authorized under condition that the passwords match each other even when the MFP 107 cannot confirm the policy. Accordingly, a user's convenience can be improved.

Other Exemplary Embodiments

Hereinbelow, the configuration of a data processing program that can be read by a data processing system including a data processing apparatus and an image processing apparatus according to an exemplary embodiment of the present invention is described with reference to memory maps shown in FIG. 10 and FIG. 11.

Figure 10:
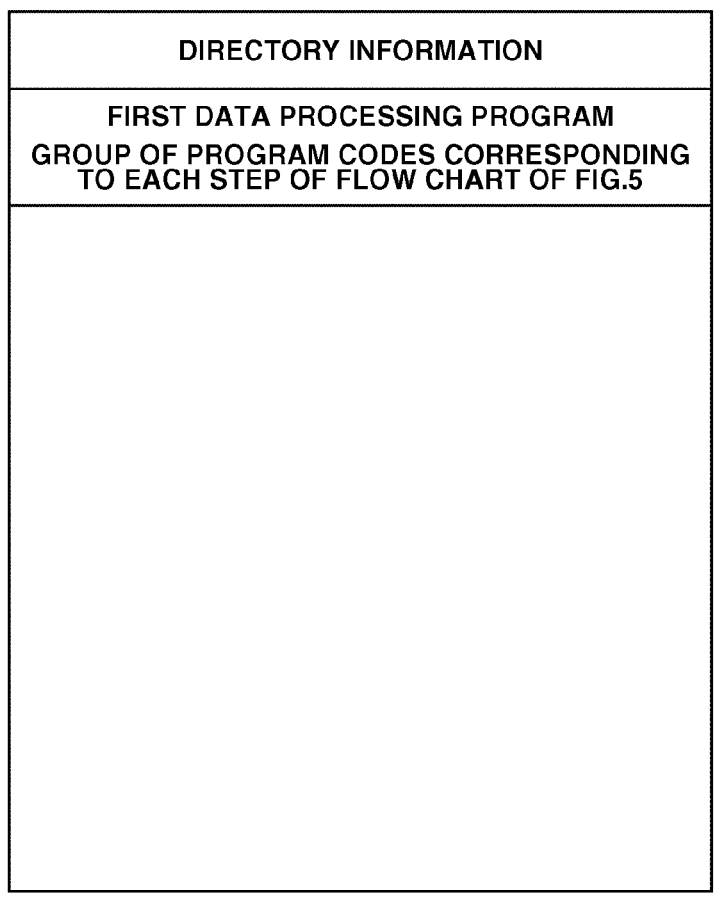
FIG. 10 illustrates a memory map of a storage medium that stores various kinds of data processing programs that can be read by the data processing apparatus according to an exemplary embodiment of the present invention.

FIG. 10 illustrates a memory map of a storage medium that stores various data processing programs that can be read by a data processing apparatus according to an exemplary embodiment of the present invention.

Figure 11:
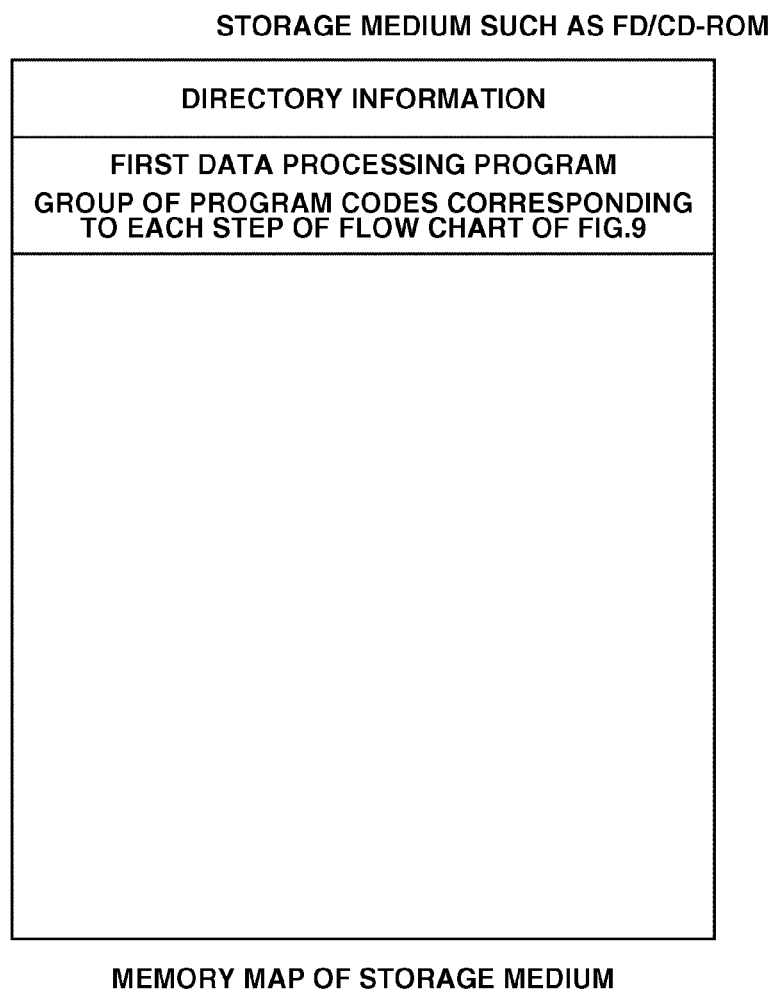
FIG. 11 illustrates a memory map of a storage medium that stores various kinds of data processing programs that can be read by the image processing apparatus according to an exemplary embodiment of the present invention.

FIG. 11 illustrates a memory map of a storage medium that stores various data processing programs that can be read by an image processing apparatus according to an exemplary embodiment of the present invention.

Although not shown in FIG. 10 and FIG. 11, information for managing the programs stored in the storage medium such as version information and information concerning the creator of a program, for example, can be stored in the storage medium. In addition, information that depends on an operating system (OS) of an apparatus that reads the program, such as an icon for identifying and displaying the program, can be stored in the storage medium.

In addition, data that is subordinate to the various programs is also managed in a directory of the storage medium. In addition, a program for installing the various programs on a computer can be stored in the storage medium. In addition, in the case where a program to be installed is compressed, a program for decompressing the compressed program can be stored in the storage medium.

In addition, the functions according to the above-described exemplary embodiments shown in FIG. 5 and FIG. 9 can be implemented by a host computer using a program that is externally installed. In this case, the present invention is applied to the case where a group of information including a program is supplied to an output device from a storage medium such as a CD-ROM, a flash memory, and a floppy disk (FD) or from an external storage medium through a network.

The present invention can also be achieved by providing a system or an apparatus with a storage medium storing program code of software implementing the functions of the embodiments and by reading and executing the program code stored in the storage medium with a computer of the system or the apparatus (a CPU or an MPU).

In this case, the program code itself, which is read from the storage medium, implements the functions of the embodiments described above, and accordingly, the storage medium storing the program code constitutes the present invention.

Accordingly, the program can be configured in any form, such as object code, a program executed by an interpreter, and script data supplied to an OS.

As the storage medium for supplying such program code, a flexible disk, a hard disk, an optical disk, a magneto-optical disk, an MO, a CD-ROM, a CD-R, a CD-RW, a magnetic tape, a nonvolatile memory card, a ROM, and a DVD, for example, can be used.

In this case, the program code itself, which is read from the storage medium, implements the function of the embodiments mentioned above, and accordingly, the storage medium storing the program code constitutes the present invention.

The above program can also be supplied by connecting to a web site on the Internet by using a browser of a client computer and by downloading the program from the web site to a storage medium such as a hard disk. In addition, the above program can also be supplied by downloading a compressed file that includes an automatic installation function from the web site to a storage medium such as a hard disk. The functions of the above embodiments can also be implemented by dividing the program code into a plurality of files and downloading each divided file from different web sites. That is, a WWW server for allowing a plurality of users to download the program file for implementing the functional processing configures the present invention.

In addition, the above program can also be supplied by distributing a storage medium such as a CD-ROM and the like which stores the program according to the present invention after an encryption thereof; by allowing the user who is qualified for a prescribed condition to download a key information for decoding the encryption from the web site via the Internet; and by executing and installing in the computer the encrypted program code by using the key information.

In addition, the functions according to the embodiments described above can be implemented not only by executing the program code read by the computer, but also implemented by the processing in which an OS (operating system) or the like carries out a part of or the whole of the actual processing based on an instruction given by the program code.

Further, in another aspect of the embodiment of the present invention, after the program code read from the storage medium is written in a memory provided in a function expansion board inserted in a computer or a function expansion unit connected to the computer, a CPU and the like provided in the function expansion board or the function expansion unit carries out a part of or the whole of the processing to implement the functions of the embodiments described above.

According to an exemplary embodiment of the present invention, a policy that is applied to electronic data that is an object of a print job can be applied to print job data that a data processing apparatus produces. Accordingly, a print job that is stored in an image processing apparatus can be managed in a similar manner as the management of the access authority and the handling authority for the electronic data.

In addition, an image processing apparatus selectively restricts outputting of print job data based on a print job data to which a policy is applied. Accordingly, the security for the print job data can be improved.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2005-357377 filed Dec. 12, 2005, which is hereby incorporated by reference herein in its entirety.

What is claimed is:

1. A data processing apparatus comprising:
    a storage unit configured to store electronic data including first data for identifying the electronic data in an external server apparatus which manages an access authority regarding the electronic data, wherein the external server apparatus identifies the access authority regarding the electronic data, based on the first data;
    a print job data production unit configured to produce print job data by converting the electronic data to be printed by a printing apparatus;
    an acquisition unit configured to acquire the first data included in the electronic data;
    an adding unit configured to add the first data acquired by the acquisition unit to the print job data; and
    a sending unit configured to send the print job data having the first data added thereto to the printing apparatus, whereby an authority for handling the print job data can be managed by the external server apparatus as well as the authority for handling the electronic data even if processing for printing the print job data is performed by the printing apparatus,
    wherein the storage unit is capable of storing electronic data that does not include the first data,
    wherein the data processing apparatus further comprises a request unit configured to, if the electronic data to be printed is the electronic data that does not include the first data, request the external server apparatus to manage an access authority for handling print job data that is produced based on the electronic data,
    wherein the acquisition unit acquires the first data sent from the external server apparatus in response to a request by the request unit, and
    wherein the adding unit adds the first data acquired by the acquisition unit from the external server apparatus to the print job data.

2. The data processing apparatus according to claim 1, further comprising:
    a user information receiving unit configured to receive information identifying a user authorized to handle the electronic data; and
    an instruction unit configured to instruct the external server apparatus to change the access authority of the electronic data such that the user whose information is received by the user information receiving unit is provided with an authority for accessing the electronic data.

3. The data processing apparatus according to claim 1, further comprising a password receiving unit configured to receive a password used for permitting the printing apparatus to output the print job data sent from the sending unit,
    wherein the adding unit adds the password received by the password receiving unit to the print job data.

4. The data processing apparatus according to claim 1, further comprising an output setting receiving unit configured to receive an output setting for outputting the print job data by the printing apparatus,
    wherein the adding unit adds the output setting received by the output setting receiving unit to the print job data.

5. A method in a data processing apparatus configured to store electronic data, the method comprising:
    producing print job data by converting the electronic data to be printed by a printing apparatus;
    acquiring first data included in the electronic data, wherein the first data identifies the electronic data in an external server apparatus which manages an access authority regarding the electronic data, and wherein the external server apparatus identifies the access authority regarding the electronic data, based on the first data;
    adding the acquired first data to the print job data; and
    sending the print job data having the first data added thereto to the printing apparatus, whereby an authority for handling the print job data can be managed by the external server apparatus as well as the authority for handling the electronic data even if processing for printing the print job data is performed by the printing apparatus,
    if the electronic data to be printed is electronic data that does not include the first data, requesting the external server apparatus to manage an access authority for handling print job data that is produced based on the electronic data, acquiring the first data sent from the external server apparatus in response to the requesting, and adding the first data acquired from the external server apparatus to the print job data.

6. A non-transitory computer readable medium storing a program for causing a data processing apparatus to perform a print job production method, the data processing apparatus being configured to store electronic data in a storage unit, the method comprising:

producing print job data by converting the electronic data to be printed by a printing apparatus;

acquiring first data included in the electronic data, wherein the first data identifies the electronic data in an external server apparatus which manages an access authority regarding the electronic data, and wherein the external server apparatus identifies the access authority regarding the electronic data, based on the first data;

adding the acquired first data to the print job data; and sending the print job data having the first data added thereto to the printing apparatus, whereby an authority for handling the print job data can be managed by the external server apparatus as well as the authority for handling the electronic data even if processing for printing the print job data is performed by the printing apparatus, if the electronic data to be printed is electronic data that does not include the first data, requesting the external server apparatus to manage an access authority for handling print job data that is produced based on the electronic data, acquiring the first data sent from the external server apparatus in response to the requesting, and adding the first data acquired from the external server apparatus to the print job data.

* * * * *